(12) United States Patent
Oon

(10) Patent No.: US 7,222,066 B1
(45) Date of Patent: May 22, 2007

(54) UNITARY LANGUAGE FOR PROBLEM SOLVING RESOURCES FOR KNOWLEDGE BASED SERVICES

(76) Inventor: Yeong Kuang Oon, 29 Darryl Street, Scoresby, Victoria (AU) 3179

( * ) Notice: Subject to any disclaimer, the term of this patent is extended or adjusted under 35 U.S.C. 154(b) by 1057 days.

(21) Appl. No.: 10/130,809

(22) PCT Filed: Nov. 27, 2000

(86) PCT No.: PCT/AU00/01460

§ 371 (c)(1), (2), (4) Date: May 20, 2002

(87) PCT Pub. No.: WO01/39039

PCT Pub. Date: May 31, 2001

(30) Foreign Application Priority Data

| Nov. 25, 1999 | (AU) | PQ4219 |
| Jan. 27, 2000 | (AU) | PQ5285 |
| Apr. 7, 2000 | (AU) | PQ6782 |
| Jun. 21, 2000 | (AU) | PQ8240 |
| Oct. 3, 2000 | (AU) | PR0468 |
| Oct. 31, 2000 | (AU) | PR1115 |

(51) Int. Cl.
*G06F 17/27* (2006.01)

(52) U.S. Cl. .................. 704/9; 704/7; 704/4

(58) Field of Classification Search ......... 704/7, 704/9, 10, 275, 251, 252, 256, 3, 4, 6, 8, 704/270, 257; 705/2, 3; 600/300, 301
See application file for complete search history.

(56) References Cited

U.S. PATENT DOCUMENTS

| 5,581,663 A | 12/1996 | Zlotin et al. ............. 395/51 |
| 5,594,638 A | 1/1997 | Iliff ........................... 395/203 |
| 5,809,476 A * | 9/1998 | Ryan ........................... 705/2 |
| 6,022,315 A * | 2/2000 | Iliff ........................... 600/300 |
| 6,745,161 B1 * | 6/2004 | Arnold et al. ............. 704/7 |
| 6,915,254 B1 * | 7/2005 | Heinze et al. ............. 704/9 |

FOREIGN PATENT DOCUMENTS

| WO | WO 94/00817 | 1/1994 |
| WO | WO 97/48059 | 12/1997 |
| WO | WO 00/14652 | 3/2000 |

* cited by examiner

*Primary Examiner*—Richemond Dorvil
*Assistant Examiner*—Huyen X. Vo
(74) *Attorney, Agent, or Firm*—Cohen Pontani Lieberman & Pavane LLP

(57) ABSTRACT

A unitary machine parsable language for use in data representation and problem solving in knowledge based services having a vocabulary of terms which derive from a natural human language to facilitate ease of comprehension by humans based upon a definition of the context of an item of information. A method of increasing the effectiveness of a knowledge based service consultation comprising splitting the consultation into at least a pre-consultation phase, a consultation phase and a post-consultation phase wherein information collected during earlier phases is electronically checked during the post-consultation phase.

23 Claims, 12 Drawing Sheets

Inside Master Directory Services – Knowledge Portal

UNITARY LANGUAGE FOR PROBLEM SOLVING RESOURCES FOR KNOWLEDGE BASED SERVICES

FIELD OF THE INVENTION

This invention relates to the field of problem solving in knowledge based services. In particular, it relates to a unitary language for problem solving resources for knowledge based services.

BACKGROUND OF THE INVENTION

In the past it has been difficult for providers of knowledge based services, such as healthcare professionals to increase their productivity in terms of clients (or patients) seen per day. This is because at present, it is necessary for service providers, such as doctors, dentists, physiotherapists, optometrists, podiatrists, to attend to the patient during the entire consultation process. This list is given by way of example only, it is not meant to be exhaustive, nor to indicate a particular class of knowledge based service providers. Nevertheless, the remainder of the present discussion will use the field of healthcare professionals in order to illustrate the concepts involved.

An effective and competent health professional easily builds up a large practice and with constant referrals from within and outside the health care network, may soon be overwhelmed with patient numbers. This limits the time available for solving the problems of the individual patient and hence translates into a deterioration of health care for each of the individual patients once the healthcare professional exceeds his or her limit of patient numbers.

In addition, the potential income of a healthcare professional is presently limited by the time available to spend with each patient. Therefore, despite the arduous acquisition of expert knowledge and skills, the potential income of healthcare professionals is at a relative disadvantage compared with other professions such as in the legal, accounting or architectural professions. In these latter professions, the situation is compounded because the professionals are better able to leverage their skills by employing junior staff to perform many of the less challenging tasks.

This problem is particularly acute for the successful healthcare professional who attracts a large following of patients. Hitherto it has been difficult to increase patient throughput. For example, the average doctor is mentally exhausted by dealing with forty patients a day with common but difficult symptomatology such as chest pains, tiredness, abdominal discomfort, headaches, shortness of breath, swelling in the legs, dizziness, tiredness, loss of weight, weight gain and chronic diarrhea. To analyse each of these problems properly takes precious time and skill.

Overall quality of the consultation and patient care involves an effective evaluation of patient problems in order to lead to an accurately defined diagnoses and treatment goals/management plans. To provide quality healthcare services requires a clear understanding of the clinical status of the patient and activation of best practice management plans for each delineated problem. In addition, it involves the healthcare professional enlisting the patient to be as cognizant as possible of his or her overall problems as well as the patients support for the treatment plans.

The current healthcare professional consultation model (and in particular that utilised by doctors) is flawed by the limited capacity of the human brain to track and evaluate the multitude of complex patient events. Healthcare professionals are naturally inclined to restrict patient numbers to obviate this problem.

Improved productivity may be achieved by addressing some or all of the following key problems:
1. The limited availability of time;
2. Problems associated with the consultation process, including;
   (a) The problem of entering patient historical notes into computerized medical packages;
   (b) The problem and time consuming task of analysing patient symptoms;
   (c) The duty of care owed to the patient;
3. The problem of the patient-computer interface;
4. The problem of augmenting problem solving capacity from a plurality of resources;
5. The need to link various problem solving resources together; and 1. The limited availability of time;
   The problem is the apparent need to spend time with the patient during the period in which they are seeking healthcare advice. This can be referred to as 'the synchronous nature of the consultation.' Appointments are each made for a block of time during which the healthcare professional spends time face to face with the patient. As the healthcare professional can only be in one place at one time, this is an apparently insurmountable lack of time (or 'time trap').

From the patient's viewpoint, it is considerably inconvenient that he or she cannot obtain a consultation, attuned to their current health context, at any time or place.

2. Problems associated with the consultation process, including;

(a) The problem of entering patient historical notes into computerized medical packages;
   Previously proposed procedures, require healthcare professionals to type in patient notes, click on a picklist or use voice control input during the consultation. Such procedures are not admitted to be part of the common general knowledge. They have been found to extend the time required for a consultation. In addition, this triangular process (which involves the computer, the patient and the doctor) will materially affect the quality of the medical thinking and decrease the value of the consultation process. For example, it has been found that a doctor's concentration on the computer screen rather than the patient can inhibit free communication and make the doctor appear more concerned about taking correct notes than about the patient.

(b) The problem and time consuming task of analysing patient symptoms;
   The typical medical consultation comprises the phases of history taking, physical examination, and assessment. This is followed up by investigations or treatment with drugs or procedures. The history component of a medical consultation is the most time consuming process that requires great concentration on the part of the healthcare professional.
   Some of the key components which go together to make up good clinical skills include memory, associations between presented data and the facility to make inferences from clear or fuzzy data. The healthcare professional has to make constant evaluations after detecting each symptom or sign. In order to home in on a diagnosis, the healthcare professional must pose the most appropriate question or look for a contributory and incriminating sign that supports his or her hypotheses. Often these symptoms are difficult and tedious to analyse, and may consume large amounts of expensive and valuable time.

When under pressure due to large numbers of patients, healthcare professionals tend to succumb to mental laziness, and employ simplistic thinking. This often leads to the ordering of more diagnostic tests which may be unnecessary or even inappropriate.

(c) The duty of care owed to the patient;

With the increasing complexity of medical care it is getting harder for the healthcare professional, especially the primary care physician or general practitioner to take good care of their patients. For example, someone with diabetes mellitus needs regular eye specialist referral, foot care, dietary advice, blood tests for HbA1c, glucose, lipids. Likewise there are specific long term management protocols for many other chronic diseases, such as ischemic heart disease and asthma.

Other necessary tasks for the healthcare professional in this regard include:
i) check to make sure that all abnormal tests are followed up with more tests, treatment or referral
ii) check for disease-drug interactions
iii) check for drug—drug interactions
iv) try to explain any presenting symptoms with iatrogenic actions
v) heck to make sure that all diagnoses are covered with some form of treatment—example a patient with gout should be offered at least allopurinol to reduce the uric acid
vi) patient is up to date with preventive health checks 3. The problem of the patient-computer interface;

In the past, certain methods utilized paper based or computer forms for example, with check lists. In certain instances, they assist in the creation of a plethora of information regarding the patient. However such a large amount of information has been found to confound the doctor's analysis. Therefore, they have been found to add little in the way of solving the patient's problem. In addition, they do not solve the problem of the healthcare professional having to note down the medical history.

4. The problem of augmenting problem solving capacity from a plurality of resources.

One particular problem solving technique includes the step of looking for information on the world wide web. This technique relies on indexing all the words in a web document. This can be problematic since such internet searches typically return tens of thousands of web documents.

Such searches involve machine conversations in the form of SGML/HTML/XML documents being sent from HTTP servers to web browsers and CGI scripts/VBScripts/Javascripts to servers. The seeking and retrieval of such documents is aided by internet smart engines, web crawlers which index the documents for retrieval by keywords or search categories. With an XML solution, a knowledge broker needs to parse the XML syntax and then parse the contents of the XML document. So really the XML solution is just pushing the problem one layer deeper and in no way solves the problems outlined in this background. The poor efficiency of present systems is compounded by the namespace problem in the knowledge domain. This is illustrated by the word 'driver' which may relate to a driver of a car or a software driver, depending on the context.

5. The need to link various problem solving resources together;

Present computer—based healthcare systems rely on numeric coding methods such as the International Classification Diseases edition 9 and 10. Basically, such systems use the concept of mapping textual descriptions to a fixed predominantly number code. Numeric based coding schemes have led to an explosion of the terms list. Maintenance is a gargantuan task and inevitably the complexity leads to collapse of the system.

The present systems for medical coding use a call by reference coding system. According to these systems, the disease and illness contexts are lumped together to be given a fixed code. A medical code often describes a central theme and has associated modifiers—for example 'injury involving cycling and traffic accident'. According to the present systems, a medical code is analogous to a gelati in which the type of cone (theme) and the flavours of gelati (modifiers) are specified. Hence a cone/gelati combination can be ordered by specifying a reference code on the wall or by naming.

Examples of reference coding are the V series injury codes in ICD10 where there are 98 modifiers or gelati flavours to injury. Even though there are only 11,000 slots for V codes, there are 3,764,376 combinations from 3 or 4 modifiers from the pool of 98. Only a theoretical 1% (11,000 out of 3,764,376) of contextual situations have been coded exactly right.

Such call by reference coding systems (such as ICD, ICPC, Read and Snomed) have been found to have a likelihood of an adverse outcome for patients or a component of the health system. Such errors are likely to arise from the loss of contextual information or misinformation, due to the complexity of using or maintaining such a system—this is termed the gelati syndrome.

In a nutshell, the problem that coding in medicine faces can be reduced to the issues of efficiency of data handling and integrity of data. Previously used reference codes such as Read or Snomed which are modeled on the numeric paradigm appear unable to adequately deal with the problems faced by e-medicine.

Such previous codes such as Snomed are rigid multi-axial systems which map a mainly rigid numeric string to a textual description of the target medical entity that may contain a plurality of contextual information.

A further problem with present medical coding systems is their inability to handle fine detail or 'fine grain information'. Such information can be crucial in medical research and lead to picking the tiny nuances that may lead to a breakthrough in understanding a patient's condition. Present systems, such as the V codes in ICD 10 often lead to a loss of coded information due to loss of context (for example, there are only 3356 V codes with which to cover all types of injuries.)

A further disadvantage of the V codes is that it has a limited range of discriminants or context modifiers (for example, for injuries). There are a total of 98 discriminants or points of differences in the V codes. These 98 discriminants include: 'accident' 'activities' 'agricultural' 'air' 'aircraft' 'alighting' 'all-terrain' 'animal' 'animal-drawn' 'animal-rider' 'antecedent' 'balloon' 'boarding' 'boat' 'bus' 'canoe' 'car' 'causing' 'collision' 'commercial' 'construction' 'craft' 'cycle' 'cyclist' 'derailment' 'driver' 'drowning' 'eating' 'fall' 'fishing' 'fixed-wing' 'glider' 'ground' 'hang-glider' 'heavy' 'helicopter' 'hit' 'income' 'industrial' 'inflatable' 'injured' 'injury' 'kayak' 'leisure' 'merchant' 'microlight' 'mode' 'motor' 'motor-' 'motor-vehicle' 'motorcycle'

'noncollision' 'nonmotor' 'nonmotor-vehicle' 'nonpowered' 'nonpowered-aircraft' 'nontraffic' 'object' 'occupant' 'off-road' 'outside' 'parachutist' 'passenger' 'pedal' 'pedestrian' 'person' 'pick-truck' 'pick-up' 'powered' 'powered-glider' 'premises' 'private' 'railway' 'rider' 'rolling' 'sailboat' 'ship' 'spacecraft' 'sports' 'stationary' 'stock' 'streetcar' 'submersion' 'three-wheeled' 'thrown' 'traffic' 'train' 'transport' 'truck' 'unpowered' 'van' 'vehicle' 'victim's' 'water' 'water-skis' 'water-transport-related' 'watercraft' 'work'.

The V series of codes are based on the template of Vnn.n[n], where there is a capital V with 2 digits before and one or two digits after the decimal point. The number of V codes possible for 3 digits: 10×10×10×10=1,000. The number of V codes possible for 4 digits: 10×10×10×10=10,000. This gives a maximum total of 11,000 possible V codes, without a total rewrite of the V codes series which would lose the multi-axial information encoded in the number and its location within the code.

The V series usually have three or four descriptor subthemes. Using the nCr formula:

With the 98 discriminants, if we choose 3 out of 98 we get: 152,096 permutations With the 98 discriminants, if we choose 4 out of 98 we get: 3,612,280 permutations Based on the assumption that 98 discriminants are all the health and related profession and medical research community will ever need, the number of code space needed is at least:

3,612,280+152,096=3,764,376

From this it can be seen that there is a gross mismatch between the contextual situations that the user wants to code and the codes allowed for by the V series design. There are 3,764,376−11,000=3,753,376 contextual combinations that may be required but which have not been expressed in the V code series. In short only a theoretical 1% (11,000 out of 3,764,376) of contextual situations are coded exactly right. In other words, 99% of contextual situations are coded wrong, do not have a code assigned to them or are lumped into the unspecified activity categories.

This has resulted in some interesting ICD codes with dubious contexts: "V81.70", "Occupant of railway train or railway vehicle injured in derailment without antecedent collision, while engaged in sports activity", "Y", "V81.71", "Occupant of railway train or railway vehicle injured in derailment without antecedent collision, while engaged in leisure activity", "Y", A still further problem with the V code system is that due to the mismatch between the number of codes and the combinations possible with the discriminants, coded information must be retrieved via a lookup table and not by inspection of the ICD codes themselves.

For example, the discriminant 'alighting' is found in both V codes below, yet there is no location specific digit representation of 'alighting' common in both V codes. This is to be expected as the coding space only allows 1 percent of possibilities. In other words, the user will have to look up the ICD table to see what was actually being coded.

"V10.30", "Pedal cyclist injured in collision with pedestrian or animal, while boarding or alighting, while engaged in sports activity", "Y", "V43.4", "Car occupant injured in collision with car, pick-up truck or van, while boarding or alighting", "N", A further problem with the numeric reference code schema is the imprecision and difficulty of coding at the source. For example, what happens to the case of the professional golfer hurt with a golf buggy while engaged in coaching a Japanese tourist at Cape Schanck? It needs to be coded as V99.90, V99.91, V99.91, V99.92 or is it V98.8 or V98.94 or V98.99 or just V99 or all of the above. Would the system allow a couple of V codes? Would not a single unified code do? This makes coding very prone to error. It makes training and staffing of coders a very specialised and arduous task—like the teaching of Latin.

There are also issues as to the proper maintenance of numerical based codes. If the number of discriminants stay the same, then there is no maintenance problem at all. The more the number of discriminants are added the more flaky the system becomes as the location specific number becomes meaningless. However with time the pressure will mount for modifiers such as 'Vietnam', 'Timor', and even ethnic labels to do useful public health research.

Certain public health officials would want to throw in a large number of sporting events such as the ones at the Sydney 2000 Olympics games. A sports medicine physiotherapist or doctor might be interested in looking at injuries involved in distance running. The V codes are confined to 2×2 decimal digits only—to add new discriminants will throw everything out of kilter. To make the new framework backward compatible is a nightmare. There are over 100 Olympic events, the possible number of valid combinations of injuries is a gargantuan figure. To code for all various possible types and causes of sporting injuries using the ICD paradigm would be an enormous task.

A good coding system must be able to cope with the technical problem of the explosion of terms in medical coding or any area of knowledge coding when necessary (such as when the end user wants coding for tiny nuances), without adding thousands and thousands of number codes. The explosion of codes that was seen in the READ coding system, which reached 400,000—would have maintenance a very difficult task.

A still further issue in respect of numerical based systems is the question of information retrieval. An ICD code once applied creates a situation whereby it is hard to retrieve, or analyse a particular subcomponent of a code. For example the code for pedestrian injuries can be anything from V01 to V09. The digits of the decimal code do not appear to have a numeric pattern that is mapped to a particular activity such as "collision", a "truck", a "car" or "sports activity" or "work".

Since the ICD code (and other similar numeric codes) itself does not have a fixed alphanumeric pattern mapped to an external reality, searching for subcomponents is possible but excruciatingly difficult. To search for all truck injuries, a belief system has to be constructed from the ICD list and all truck injuries are mapped to a collection of ICD V codes that have truck as a possible cause of the injury.

The lack of 'regular patterns' means that the moment a single new ICD code is issued, the analytical tools for ICD diseases are deprecated. To update the analytical tool to the level of correctness, each new ICD code has to be analysed, its impact on every subroutine of the analytical machine needs to be assessed and each subroutine has to be individually updated.

Traditional, numerical based systems are limited as to the level of complexity of events described. As time goes by, scientists become more and more curious. They may want to set up a study to see if the gender of the driver plays a role in serious car accidents. The colour of the vehicle may play a role in serious car accidents and may come up for serious contemplation. The relative damaging results of side on, versus head on collisions may be a topic for a master's dissertation.

From another angle, some minor social practices may lead to profound changes in a disease demographics. The tiny nuances are the source of many medical breakthroughs. An example is the use of condoms or the practice of circumcision in the spread of AIDS. A disease representational system must be able to code for these tiny variations as a minimum requirement. In that sense the current ICD scheme is not sensitive or expressive enough to code for a comprehensive picture that is required by the researchers. These same researchers might create an ad hoc series of codes to be used once and discarded.

Associated with the problem of coding for medical entities (or any entity in any knowledge domain) there is the problem of converting handbooks and textbooks guidelines into fully fledge computerized decision support, offering answers at the point of clinical decision making. This is distinct from conversion of text material into a series of lookup pages in HTML housed in a web browser. The type of decision support required is more similar to the situation where the user is doing data entry into a clinical recording system and by clicking on a button, the computer will respond with the most pertinent treatment plans tailored to that particular patient.

An example of the type of rule to be captured is:

If the patient with endocarditis is an adult, and has no allergy to penicillin, then give:
1) Benzylpenicillin 2 g 4 hourly intravenously for 2 weeks
OR
2) Gentamycin 2 mg/kg 4 hourly intravenously for 7 days, monitoring blood levels.
OR
3) Vancomycin 1 g intravenously 12 hourly PLUS Gentamycin 2 mg/kg 4 hourly intravenously, both for 3 days.

Coding the above with a numeric coding system is a challenge.

SUMMARY OF THE INVENTION

According to the present invention, there is provided a unitary machine parsable scripting language for use in data representation and problem solving in knowledge based services having an organised and classified vocabulary of terms which derive from a natural human language to facilitate ease of comprehension by humans, the language based upon the use of expressions containing said terms and representing items of information, wherein said expressions selectively include contextual code components to provide a context of an item of information, the contextual code components comprising terms from said vocabulary, each term able to embody both an intrinsic meaning and a place value significance, the place value significance augmenting the meaning of the resultant expression depending on the positional relationship of the term to a contextual code component.

By providing a machine parsable language which is readily comprehended by humans and is able to define the context of items of data, it is possible to provide a more flexible coding system. With such a system, it is possible to provide benefits including an increased efficiency of communication between humans and machines, shortened list of necessary codes, decreased incidence of spurious results, the ability to deal with a wide range of levels of detail, and an increase ability to capture rules to be used in heuristics.

According to a preferred embodiment, the ability to define the context of an item of information derives at least in part from the use of a linnean hierarchy.

According to another preferred embodiment, the ability to define the context of an item of information derives at least in part from the use of context scripts.

Preferably, the context scripts are able to stand alone as independent codes and preferably they are attachable and detachable and preferably (in the case of the area of health) to a clinical code such as symptom, sign, disease, drug, surgical procedure or clinical management. Preferably context is able to be separated, and in the area of health, preferably illness context is separable from disease itself.

According to a further preferred embodiment, the language comprises modifiers to effect information tunnelling and thereby increase expressivity with minimal compromise of computer precision. Preferably the modifiers are attachable and detachable.

Preferably the modifiers cascade into consecutively deeper layers so as to minimize ambiguity of context. Preferably context is able to be analyzed by utilizing indented diagrams to fix contextual meaning.

According to a particularly preferred embodiment, there is further provided an accrual context to enable collection and utilization of a pool of background data.

According to a still further embodiment, a blessing level is provided for grading available options. Preferably a blessing level is attached to each actionable option. According to a still further embodiment, a uniform syntactical and semantic construct is provided to facilitate transportability across a variety of applications.

According to a still further embodiment, the applications comprise information collection, problem solving, heuristics and communication. According to a still further embodiment, a belief system is utilized to define the components of the language. According to a still further embodiment, a single name space is provided for all terms.

According to another preferred embodiment, there are further hierarchies defined below the species level. Preferably there is multiple inheritance in order to minimize the problem of ostension. According to a still further embodiment, a species or any of its subclasses can have membership in any number of taxa at any level. According to a still further embodiment, a taxon at a certain level in a hierarchy does not need to be a descendant of a taxon at the level immediately above it.

According to a still further embodiment, the code expresses heuristics for decision support.

According to a still further embodiment, the code provides the medium for dialog among a plurality of problem solving resources. According to a still further embodiment, the code enables bi-directional communication between problem solving resources.

According to a still further embodiment, the language further comprises the ability to be parsed by using pattern matches. According to a still further embodiment, there is means is provided for context conflicts to be identified. According to a still further embodiment, a means is provided for associative, commutative adding of knowledge.

According to a still further embodiment, non-contextual modifiers may be recruited into contextual modifiers to provide an extensible framework. Preferably modifiers may be mixed and matched to describe basic themes. According to a particularly preferred embodiment, the field of knowledge is health.

According to another aspect of the invention, there is also provided a method of reducing contextual conflicts in a language as defined above, comprising the use of expressions involving proposition construction utilising themes, plots and subplots to clarify context. According to a further embodiment, there is provided a method of reducing contextual conflicts by limiting the possible modifiers used.

Preferably, the method employs a dictionary of incongruous terms that are stored as associations.

Preferably, the method comprises the step of parsing the code to detect a conflict with the linnean belief system under which the words of the language are classified.

According to another aspect of the invention, there is provided a method of knowledge-based service consultation, the consultation involving comprising a preconsultation phase, a consultation phase and a post-consultation phase, the preconsultation phase involving the collection of context-oriented information in the scripting language as defined above, and wherein information collected during earlier phases is electronically checked during the post-consultation phase.

By providing a split consultation and electronically checking information during the post-consultation phase, it is possible to increase the efficiency of the use of time through increasing the efficiency of steps including; entering patient information and analysing patient symptoms as well as provide better overall healthcare to patients by double checking that relevant issues are dealt with.

Preferably, the method utilises a context oriented servo pre-consultation event collector to collect event information and context information from the service receiver during the pre-consultation phase.

Preferably, the pre-consultation event collector collects information by posing a question, storing the answer and posing further questions based on the answers previously given. Typically this is computer based.

In a preferred embodiment, the method includes the steps of:
(a) displaying a best candidate key in response to inputted data;
(b) adding the response to a list of collected facts already obtained;
(c) if unsure of an ultimate answer, selecting a next best candidate key;
(d) given the collection of facts, show a list of possible diagnoses;
(e) given the diagnoses, show facts that may indicate them;
(f) from the results in step (e), remove every fact already obtained held in collection of step (b);
(g) select the best candidate key left in step (f),
(h) go back to step (a).

Ideally, the pre-consultation event collector is able to rephrase questions it has posed.

Preferably, there is an ability to interrogate the pre-consultation event collector about the information it has stored.

Preferably the pre-consultation event collector may be interrogated as to:
(a) its current evaluation on the differential diagnoses;
(b) its rationale for asking the candidate question;
(c) the current status of the patient regarding symptoms and signs already elicited; and
(d) the choice of tests based on the current evaluation of the patient.

In a preferred embodiment, a means is included for the user to change the line of questions posed by the pre-consultation event collector. In the area of health, preferably the user may change the line of questioning into another anatomical or pathophysiological axis.

The service receiver may be restricted to answering 'Yes', 'No', or 'unsure' to questions posed by the pre-consultation event collector. Preferably the choices of responses are extendable to:
(a) why
(b) back
(c) suggest diagnosis
(d) suggest tests
(e) change line of questioning
(f) show list of patient responses so far
(g) rephrase—which gets the computer to explain the question using alternate terms
(h) machine—listing of differential diagnoses
(i) why—the rationale for asking the question is explained
(j) status—history of the patient collected thus far
(k) Tests—machine recommended list based on evaluation of symptoms and signs
(l) Print the contents of the transcription pane Preferably, the pre-consultation event collector is able to produce a human and/or computer readable output as a manual or electronic record for the consultation phase.

Preferably, the output also represents the service receiver's reasons for using the service and preferably identifies the key problems as they see them. Preferably the output also comprises an analysed presentation that forms the basis of the background notes in an electronic record.

Preferably, the consultation phase produces a human and/or a computer readable output for the post-consultation phase.

The post consultation phase may comprise methodical parses for any lapses on the part of the service provider. A further step of informing the service provider of further tasks that could be performed to assist the service receiver may be included. Preferably in the area of health, the post consultation phase informs the service provider (eg Doctor) what tests he or she should recommend to assist the service receiver (patient).

Preferably the post consultation phase includes apparatus such as:
(a) a data receiver to selectively receive one or more medical files pertaining to a first patient,
(b) a recorder to record and store each medical file of the patient in terms of the predetermined syntactical and semantic constructs; and
(c) a query module to receive a query from a predefined source which has been assigned selective access to the recorded material in terms of the predetermined syntactical and semantic constructs, and to transmit relevant recorded material to that source.

Preferably the post consultation phase includes the further steps of:
(a) selecting a list of diseases associated with symptoms and signs but excluding the diseases that the patient is known to have
(b) ranking the list of tests that should have been ordered to confirm these diagnoses
(c) of the ranked tests, select the tests that have not been executed in the past three months and output the top ten ranked tests that the health professional should have ordered.

According to another embodiment of the present invention, information is stored, transmitted or utilized in a language as defined above. The field of knowledge may be health. Where there is provided a pre-consultation event collector, an apparatus may be included for performing an electronic check of information during the post-consultation phase.

According to another aspect of the invention, there is provided method of solving problems in a knowledge based service comprising the steps of:
(a) providing a communications system for communication among a plurality of problem solving resources;
(b) providing a language as defined above to enable dialog among problem solving resources; and
(c) providing for the exchange of information by means of dialog between problem solving resources using the language.

By providing a language according to the present invention for a method of problem solving, it is possible to link various problem solving resources and allow for them to augment each other's problem solving capacity.

There may be provided a step of communicating a set of heuristics from one problem solving resource to another. At least one of the problem solving resources may be human and/or may be a computer.

Preferably, the problem solving resources augment each other's problem solving capability. The problem solving resources may be capable of contemporaneous communication with a plurality of other problem solving resources.

Preferably, the invention comprises at least the following components:
(a) the servo pre-consultation history event collector phase;
(b) the middle consultation phase with human physician involvement and face to face contact;
(c) the post-consultation servo oversight controller and medical record administrator phase;
(d) bi-directional context sensitive knowledge scripting unitary health language; and
(e) combining all preceding components, and recruiting additional problem solving resources distributed over a computer network, a knowledge broking community where any problem solving resources that is "weak" may opt for support by querying any number of problem solving resources within the community at any phase or time.

According to another aspect of the invention, there is provided a method of increasing the effectiveness of a knowledge based service comprising the steps of:
(a) utilizing a method of increasing the effectiveness of a knowledge based service consultation as defined above; and
(b) utilizing a method of solving problems as defined above.

FURTHER DESCRIPTION OF THE INVENTION

The following discussion provides further background and explanation of various aspects of the invention. The discussion uses the field of healthcare professionals (and frequently the sub-category of doctors) in order to illustrate many of the concepts of the invention. It should be remembered that other knowledge based services are considered to fall within the ambit and scope of the present invention.

The Limited Availability of Time

A key problem then is how to subdivide the time laborious-tasks into components that can be delegated to machine processes. The history taking component can be replaced by an automated servo consultation system, each response from the patient must bringing forth a round of evaluation of overall patient status, much like a machine evaluation of a chess position. For a machine to take over, the machine has to be as good as the human, if not better, at collecting and analysing a medical history. Before the first question is fired at the patient, this servo consultation system must import a representation of current patient clinical status. Moreover, the patient-machine interface must be reduced to a simplistic Yes, No or Unsure response—delivered by voice activation or clicking on one of the three buttons in a visual display unit. This invention is designed to improved the quality of healthcare delivered to an increased patient population given a fixed number of medical staff caring for these patients. It suits competent and popular healthcare professionals who will be able to satisfy an increased patient number base and thereby derive the economic benefit of servicing more patients. From this same economic equation, the healthcare professionals in high demand, may be able to service their increased patient numbers at a lower pricing model following the economy of scale. This invention is therefore also ideal in third world countries or societies ravaged by conflict whereby health services/healthcare professional number are severely impaired; this service can be via a desktop or local network installation OR via distribution of components of the split consultation over the internet.

Another beneficial effect is that the patient may be able to obtain the best medical advice at any price in a timely fashion from a plurality of problem solving resources such as knowledge brokers housed in prestigious medical institutions or healthcare providers scattered over the internet.

The Problem of the Patient-Computer Interface

The patient-machine has to be simplified, at the most elementary level, to selecting one of three choices by a button click activated by a pointing device or via voice. The pre-consulation servo consultation event collector has a simplified patient machine interface that is driven by a minimal set of three responses viz. 1) Yes 2) No and 3) Unsure. Now these commands can be fed back by means of clicking on a Yes/No/Unsure buttons in a desktop application or in a web browser or via voice commands. Optionally there could be more choices of patient feedback such as 4) Why 5) Back 6) Evaluate diagnoses 7) Evaluate tests 8) Change line of questioning 9) Show list of responses so far.

The Problem of Augmenting Problem Solving Capacity from a Plurality of Resources An artificial learning community of problem solving resources for enhanced problem solving, predicated on a bi-directional generic knowledge scripting language, comprising means for communication among a plurality of problem solving resources to augment each other problem solving capability is helpful in many human endeavours, both in the field of health (or medicine), science and the arts.

In this artificial learning community, the problem solving resources are able to have automated meaningful dialog with one another, pose each other questions and answers and at the same time have facility to learn from the dialog it has with its collaborative problem solving resources.

A specific example: collaborative problem solving in healthcare on a network of computers can be augmented by the building of artificial learning community of problem solving resources that are sited in research centres, universities and hospitals. For a network of problem solving resources to collaborate to achieve an artificial learning community for problem solving we need to implement a system of dialog among the computers and provide a language that supports a framework for problem solving. In the ideal situation computerized problem solving resources are non-absent minded professors. One can communicate with these professors in a high level language such as English. These non-absent minded professors will cognate any input and solve any problematic queries with a collection of possible solutions based on what they have learnt. The difficulty with implementing problem solving resources utilising a high level language like English is associated with the problems of natural language understanding by computers, such as contextual drift and a lack of a generic framework for problem solving. This difficulty involves the need for a problem solving framework to assemble the learnt knowledge to arrive at the solution or solutions to the problem posed.

The Problem of Augmenting Problem Solving Capacity from a Plurality of Resources.

It has been found that the tagging of the documents does not allow a true dialog to occur between and among the parties on the internet.

The learning community engendered by current Web browser /HTML technology is an essentially human learning experience that is augmented by the access to many billions of documents placed online. The seeking and retrieval of such documents is aided by internet smart engines, wed crawlers which index the documents for retrieval by keywords or search categories. The current web/web browser is "dumb" software in the sense that they do not have a belief system built in either the web-client or the server. For a more intelligent web of automated problem solving resources, we need to build up a network of such resources which instead of just conversing or communicating with one another we have real dialog among this plurality of problem solving resources. There is a namespace problem in the knowledge domain, the word driver can mean car or software context. To avoid such a name space conflict this invention has resort to a unitary knowledge scripting language with a single name space.

The Need to Link Various Problem Solving Resources Together;

A major obstacle to the split consultation invention is a need for a health language system that can link these problem solving resources which may comprise machine problem solving resources and health workers in a bi-directional manner, into a synergistic web that is capable of solving the patient's problems. What is required is a single integral unitary knowledge scripting language for the community of humans and machines that is able to cover the spectrum of medical coding and classification, knowledge representation, health record representation, expressing the heuristics that is foundational for decision support and provides the medium for dialogical intercourse among a plurality of machines and humans. A single integral unitary knowledge scripting language confers the twin advantages of simplicity and robustness of a unified approach.

Contrast this with a scenario of a Babel-like plurality of solutions for 1) medical coding 2) a syntax for decision support 3) an electronic document standard for record interchange 4) a syntax for knowledge representation 5) a protocol for machine—machine dialogue and 6) a syntax for human-machine communication. The challenge then is to make all the components of the split consultation talk to each together in one language, this same health language represents its internal states, the patient problems, the medical knowledge and the decision support rules. The components of this split consultation need to communicate with one another regarding patient status and contexts such as list of allergies, medications and active problems utilising the same language. The components of this split consultation are problem solving resources. These problem solving resources can be fully human, fully machine or a mix of human/ machine. The problem is to invent such a language that is capable of direct apprehension by both humans and machines. A language that is capable of direct apprehension by both humans and machines is easier to debug and enables scalability. More importantly, in the mission critical area of health, humans trust machines more when they understand and directly apprehend how the machines think, especially when humans and machines communicate with the same language.

This same health language must also be able to code medical scenarios that are very generic such as 'psychiatric disorder' and to an extremely fine detail—such as injury involving a car passenger sitting on the driver side hit from the rear and not wearing a seatbelt. Expressivity of a health language approaching natural language, yet demonstrate the discipline of a computer high level language, is desirable. Specific problems with prior art coding systems are defined below.

For computerized decision support to function effectively in medical and non-medical systems, a system of coding is needed for data, knowledge and heuristic representation.

A scripting language based on keyword themes and modifiers externally defined in a hierarchy and modifier scripting of basic themes lends the power of natural language expression yet retains the strict discipline needed for precision computer processing. It is associative, commutative and lends itself to collaborative concurrent production of intelligent knowledge based systems.

Call by name/scripting as in the unitary knowledge scripting language, is exact and precise in contextual input and output. Unitary knowledge scripting language has in excess of 220 contextual modifiers for injury alone. With up to 4 modifiers, UHL specifies over 24 billion injury variants (including sports) in 3 pages versus the 7,151,370 pages needed for reference coding to cover the same ground. In medicine, the number of themes/cones and modifiers/gelati keep expanding, the reference coding system has to keep track of the relationships among the exponentially growing codes; while UHL keeps track of the relationships among the individual theme/cone and modifier/gelati only.

The alternative to this method is a system comprising an all but natural human and computer readable language of health termed Docle. Docle comprises terms that are coded and classified in a Linnean hierarchy in the manner of biological classification. Scripting of these terms in combination with modifiers, with predefined computer syntax; allows the creation of UHLs to represent patient medical files and medical knowledge for decision support. The case for Docle is threefold today: 1) Its unparalleled capacity for decision support—the knowledge spreadsheet is one example 2) Its role for a universal medical record interchange mechanism, the DocleScript patient record 3) Its inherent simplicity and efficiency as evidenced by the case study on the coding of injuries in medicine.

Case Study—Injury Coding in Medicine

'Men, it is a mad-brained trick, but it is no fault of mine.' Lord Cardigan

The lesson from the charge of the light brigade can be applied to medical coding—are all numeric codes like Raglan's courier?

The circumstances surrounding the charge of the light brigade in 1854 at the battle of Balaclava shows the importance of context:

Lord Raglan, the British C-in-C looked down from a high vantage point and saw a small Russian force capture some British guns located at a ridge. He scribbled an order to the Light Brigade, located at the bottom of the valley, to advance rapidly to prevent the Russians from carrying off the guns. From his vantage point, the meaning was obvious.

Unfortunately, Lord Cardigan, the Light Brigade commander was too far down to see the crest of the ridge. The only guns he was aware of were the ones which covered the main Russian army at the end of the valley. Unable to extract more information from Raglan's courier, the officers made what sense thy could of the order and ordered the fateful and fabled charge that is immortalised by Tennyson's poem. The charge could have been avoided by a series of contextual modifiers such as a DocleScript type instruction:

attack &start@location %Map21F9 &target@location%Map21B12 &force@enemy%100 &objective%protection@guns%4 &force@self%50 &casualty@allowable%50 &when%now!

... maximal loss would have been 50 men, the target would have been obvious.

Medical decision support needs fine grain information. So does medical research to pick up the tiny nuances that may lead to a breakthrough in understanding. Loss of coded information, loss of context is seen in the injury or V codes in ICD 10 where 3356 V codes covers all types of injuries. By contrast the Docle codes covers for all injuries, including all Olympic and non-Olympic sports events utilising less than 221 modifiers. Using a minimal of 4 modifiers to describe 250 basic types of injuries, over 24 billion injury codes can be scripted. More complex expressions rivalling natural speech are possible using information tunnelling. A system of context conflict catching is described.

Concequently, there is provided a system and method of increasing patient throughput, quality of care and enhanced problem solving, with a split servo medical consultation with a unitary knowledge scripting language, including the implemented steps of:

i) the splitting of the consultation into a plurality of servo assisted phases utilising a plurality of problem solving resources, both machine and human, which are optionally asynchronous and located at same or different loci;

ii) activation of an asynchronous automated servo pre-consultation phase that eliminates the need for a healthcare professional to be present during the arduous task of collecting, analysing a medical history and outputting the results to the next step;

iii) a real time middle-consultation servo assisted phase with both the healthcare professional and patient present;

iv) an asynchronous automated servo post-consultation phase with oversight control by a machine medical record administrator;

v) the option of bi-directional communication with existing and additional external problem solving resources, at any phase of the split consultation, implementing a learning community of problem resources both human and machine;

with all transactions carried out in a single integral unitary knowledge scripting language of uniform syntax and semantic structure.

In this invention, the medical consultation process is split into a plurality of disparate potentially asynchronous phases utilising problem solving resources at potentially different loci—with all phases interconnected by a bi-directional unitary knowledge scripting language. In the basic embodiment there are at least the following components: I) the servo pre-consultation history event collector phase II) the middle consultation phase with human physician involvement and face to face contact III) the post-consultation servo oversight controller and medical record administrator phase IV) bi-directional context sensitive knowledge scripting unitary knowledge scripting language and V) combining all preceding components, and recruiting additional problem solving resources distributed over a computer network, a Problem Solving Community where any problem solving resources that is "weak" may opt for support by querying any number of problem solving resources within the community at any phase or time.

The split system leverages on the intrinsic strengths of the human practitioner and the machine depending on clinical context. By splitting the consultation process into a plurality of discrete phases and hiving off the work best performed by a machine, the invention saves time while making the consultation more comprehensive. This invention solves the problem of re-integration of patient care in a split system by using the same single integral unitary knowledge scripting language for communication and computer representation of patient data, medical knowledge and medical heuristics.

Furthermore, the linking of the pre-, middle and post consultation phases into a virtuous cycle of care is more than a simple one way circular path. It is enhanced by a multi-directional flow characterised by the 1) feeding into both the pre-consulation and middle consultation phases by the post consultation phases 2) feeding into the pre-consultation phase by the middle phase 3) at any phase, a dialog in unitary knowledge scripting language can be initiated with other trusted problem solving resources.

This split consultation system invention gets the computer out of the way for the real life physician patient encounter during the middle phase, yet delivers maximal benefit from machine expert systems in saving time and avoiding medical litigation. The servo pre-consultation phase is purely machine—patient interaction which frees up precious physician time, yet collects in an expert manner a detailed history and highlighting gaps for the physician to cover during the middle phase if required. During the middle consultation phase, the abilities of a human expert are utilised in clinical examination and clinical evaluation and clinical judgement. This middle phase of the consultation is important for the reasons of effective consultation with elements of engagement, empathy, education and enlistment of patient to establish a therapeutic milieu. Humans, rather than machines, excel in these areas.

I) Servo Pre-Consultation Historical Event Collector

The servo pre-consultation historical event collector is the basis of the first phase of the split consultation and is an entirely patient-machine process that frees the healthcare professional from the history taking aspect of the consultation process. This allows the healthcare professional to concentrate his mental energies during the face-to-face middle consultation itself. This invention obviates the triple healthcare professional tasks of: 1) retrieving existing history of patient illness 2) the task of patient history collection/analysis and 3) the task of data entry of the history component of the consultation, by importing the analysis and data generated by the patient with his interactions with the servo pre-consultation event collector phase. The context sensitive unitary knowledge scripting language output from this pre-consultation phase is the history data to be integrated in the medical record as the representation of the historical content of the consultation. The healthcare professional can correct and embellish aspects of the machine derived history if required. Thereby freeing precious time for the healthcare professional to think about other aspects of medical management. The are other significant benefits of this pre-consultation phase besides its ability to produce a computer ready high level language medical script that automates the notating of the medical history aspect of the consultation itself. This invention overcomes one of the greatest impediments to computerization of medical notes. This impediment, in the prior art, is of a triangular nature involving the healthcare professional, the computer and the patient. The computer must not come in between the healthcare professional and the patient as can happen when the healthcare professional starts keying in the medical history in an electronic medical record system during a face to face consultation with the patient. The solution provided by this invention is to get rid of the healthcare professional entirely in the pre-consultation servo phase of the consultation. The added value of a well constructed and computer ready medical history created entirely by the interactions of the patient and the servo event collector is that the healthcare professional's mind is still fresh when finally approaching the patient face to face. His mind is not yet cluttered by the process of clawing through a difficult medical history.

Because the computer does not get tired, it delivers a more thorough and well thought out historical narrative and analysis. The operation of the history event collector is based on the servo mechanism of responsive 'listening' to the patient. The process of history event collection starts from posing one question at a time. The first question may be seeded from the patient nominating the anatomical region that is the source of his symptom.

Alternatively, the first question can be randomly selected from a list of high yield candidates. Symptoms associated with that anatomical region are all candidates, candidate selection is then based on the one with the most chance of eliciting a positive response.

The candidate question is then posed to the patient—which then has to answer in the affirmative (Yes), negative (No) or Unsure. Based on each response, the computer will evaluate the clinical status of the patient. In the preferred embodiment, the evaluation on the patient is carried out using the knowledge spreadsheet query comprising the steps of:

a) Display the best candidate key.

b) Get the response, add to list of collected presentation (symptoms) already asked.

c) If unsure, select next best candidate key.

d) Given presentation show unity (the diagnoses).

e) Given the diagnoses, show presentation (symptoms) candidates.

f) From the results in step e, remove every symptom already asked held in collection of step (b).

g) Select the best candidate key left in step (f), go back to step (a).

In the preferred embodiment the pre-consultation phase comprises an automated servo historical event collector with a modal visual display unit dialog or voice activated dialog, that comprises a minimal set of only three acceptable responses of 1) YES 2) NO 3) UNSURE. A simple minimal set of only three response choices delivers simplicity to the general population and ensures the viability of the concept as any interface more difficult than three buttons might detract from its general applicability with the general public. In this embodiment, the healthcare professional is dissociated from the pre-consultation phase, which involves only the patient and the servo event collector which obtains a good competent history for the healthcare professional. During this phase the patient need not be collocated with the healthcare professional, and can be asynchronous from the middle consultation. This session can take place at the patient home computer or via the internet at any time before the appointment with the healthcare professional. Alternatively the pre-consultation can take place just before the actual appointment. This pre-consultation servo event collector comprises means to construct an expertly taken medical history despite its simple user friendly modal dialog.

In another embodiment the modal dialog choices for the patient are extended to include the following menu options of: 4) Why 5) Back 6) Suggest diagnoses 7) Suggest tests 8) Change line of questioning 9) Show list of patient responses so far. In the preferred embodiment, the pre-consultation servo event collector, at the end of the session with the patient, produces an output in unitary knowledge scripting language that is germane for inclusion into the patient notes in the middle phase of the consultation. All the data are represented in a manner that is directly comprehensible to the computer and the healthcare professional, and amenable for analysis in a device such as a knowledge based medical spreadsheet.

II) The Middle Consultation Phase

The middle phase comprises the face to face patient consultation. The healthcare professional can embellish the history further and fill in any gaps. In the preferred embodiment, the data collected in the pre-consultation is delivered in unitary knowledge scripting language. The construct enables the data collected to be placed as a worksheet of the medical knowledge spreadsheet. At the middle-consultation when the patient meets the healthcare professional, the history collected from the pre-consultation phase is ready to be integrated into the electronic medical record proper. In the preferred embodiment the same unitary knowledge scripting language supports and connects the knowledge spreadsheet of the middle phase and the pre-consultation servo history event collector. In the preferred embodiment, the electronic medical system used by the healthcare professional is a medical knowledge spreadsheet, and the output from the pre-consultation phase is tailored to fit into one or more of this knowledge spreadsheet worksheets and is germane for further knowledge spreadsheet analyses by the healthcare professional during the middle consultation as all communication is in unitary knowledge scripting language. Any data generated by the actions of the patient must be vetted and validated by the healthcare professional at this middle phase, before the data is integrated into the patient medical record.

III) The Post-Consultation Servo Oversight Controller and Medical Record Administrator.

The third phase deals with the fear of incompetent medical practice and the fear of iatrogenic lapses. This particular angst is overcomed by the asynchronous third phase that evaluates the clinical status of the patient and scans for any lapses on the part of the healthcare professional. This third phase also produces the same computer ready unitary knowledge scripting language script that is inputted into both the pre-consultation and the middle-consultation phases to modulate the behaviour of the split consultation system. This third phase of the split consultation invention addresses the problem of medical oversight. The healthcare professional-patient relationship is strained by a patient population that is intolerant of medical failure or mistakes. Often this frustration is converted into legal action. The post-consultation phase reinforces good and safe practice using best practice guidelines by incorporating these guidelines into the post-consultation phase. Among the issues checked for in this phase are for example:

a) Check for drug—drug interactions.

b) Check for drug-disease interactions.

c) Matching of active presentation events with known adverse drug reactions d) Matching of active diagnostic events with known adverse drug reactions.

e) Check for failures to refer to specialist/ancillary when appropriate e.g. abnormal pap smear. A more comprehensive list is given below.

f) Evaluation of patient status against expected outcomes in patient management.

g) Means ends analysis h) Reporting to the healthcare provider.

Iv Bi-Directional Context Sensitive Unitary Knowledge Scripting Language

The direct obstacle to such an invention is a need for a medical language system that has property of computer and human direct apprehension, providing the means for these problem solving resources to communicate bi-directionally, into a synergistic web that is a learning/problem solving community. What is required is a single integral unitary knowledge scripting language for the community of humans and machines that is able to cover the spectrum of medical coding and classification, knowledge representation, health record representation, expressing the heuristics that is foundational for decision support and provides the medium for dialogical intercourse among a plurality of problem solving resources that includes both humans and machines; confers the twin advantages of simplicity and robustness of a unified approach.

Contrast this with prior art scenario of a Babel-like plurality of solutions for 1) medical coding 2) a syntax for decision support 3) an electronic document standard for record interchange 4) a syntax for knowledge representation 5) a protocol for machine—machine dialogue and 6) a syntax for human-machine communication.

With the prior art, medical coding is based on a call by reference coding system; a medical term or concept is mapped to a largely numeric abstract key; example head injury in a car accident may be given a key V5577. Whereas this unitary knowledge scripting language invention uses direct naming and contextual scripting to represent medical data, for example the same injury is represented by: injury.head&ctx@ill,motorCarAccident. The latter term is capable of direct apprehension by humans and is capable of being parsed by a computer.

A quasi natural language such as the unitary knowledge scripting language obviates the task of assigning meaning to codes as the UHL codes are human readable, self-explanatory and self-definitional. The issue of the inter-relational aspects of the UHL terms or words is resolved by placing them in a modified linnean hierarchy. The next task was to convert the UHL words into a language stream. Using the analogy of brain physiology, it is the glial cells that provide the support framework for nervous activity by the neurons. Likewise with UHL, there is an elaborate linnean contextual framework that allows UHL terms to be strung together into a language stream. The resultant unitary knowledge scripting language bears the following hallmarks:

1) ability to code to any degree of granularity, anything that the medical profession will ever want coded; from the finest detail such as "chest pain radiating to the left arm" (chest@pain>arm@left) to a coarse grain entity such as "psychiatric disease" (psychiatric@disease), yet maintaining and mapping the interrelationships among the granularities.

2) is capable of being parsed by a computer compiler/interpreter to facilitate human-machine and machine—machine dialogical intercourse/decision support.

3) the same version is human readable, otherwise it is not a unitary language.

4) the medical and non-medical aspects of the language is folded into a singular name space, a singular syntax and a singular semantic space in order to avoid naming and semantic conflicts; means to represent multi-purpose medical knowledge/data.

5) performs all the roles of a natural medical language, at the same derives all the benefits from the digitisation of medical data, these same benefits such as accurate computer retrieval and machine decision support, which are barred to natural language.

V) Problem Solving Community Connected by Bidirectional Context Sensitive Unitary Knowledge Scripting Language.

An artificial learning community for enhanced problem solving, predicated on a bi-directional knowledge scripting language called the unitary knowledge scripting language is described. It comprises means for communication among a plurality of problem solving resources to augment each individual problem solving capability. Problem solving is effected by either i) querying other problem solving resources which will answer in the unitary knowledge scripting language format or ii) requesting another problem solving resources for a set of heuristics associated with a particular theme or disease topic, the other problem solving resources will then communicate back in unitary knowledge scripting language the set of heuristics pertinent to solving problems concerning the particular theme. The unitary knowledge scripting language comprises means for knowledge scripting, thereby enabling problem solving resources to automate knowledge acquisition by asking and receiving in the form of knowledge scripting unitary knowledge scripting language, either direct answers or heuristics to augment their problem solving ability.

This community of problem solving resources comprises 1) means for enhanced problem solving through mutual augmentation of the capability of each individual problem solving resource to solve problems by the use of this knowledge scripting aspect of this unitary knowledge scripting language as input/output 3) as a means for the same problem solving resources to communicate its solutions to problems to both humans and/or other problem solving resources with output via the same unitary knowledge scripting language. This unitary knowledge scripting language comprises means for incremental, decremental, associative, and commutative change in the sum total knowledge in each of these computerized problem solving resources. These problem solving resources comprises means for both input and output utilising the same unitary knowledge scripting language. This bi-directional scripting language allows the processes of "dialogs" among these plurality of problem solving resources to effect solutions to any general health problem. Through the commutative and associative features of this knowledge scripting unitary health language, solutions provided for by problem solving resources can be adjusted back in time prior to the inclusion of knowledge from a given point in time. This unitary knowledge scripting language is defined in Extended Backus Naur Format and in the preferred embodiment uses modified Linnean classification of key words, information tunnelling to prevent contextual drift and the graduated discrete definitional and planning model for problem solving. The same scripting language comprises means of querying and exchange of views or knowledge which are prerequisites of a true dialog in a consultation setting.

Instead of making software smarter to deal with the complexity of natural language which is the "smartening up the software" approach; the solution proposed is a "dumbing down" in the language used to allow computers to communicate with each other. Instead of multiple name spaces to avoid contextual drift, a singular name space to cover all aspects of human knowledge and human thinking is proposed.

The vital ingredient of an artificial learning community is a bi-directional knowledge scripting language that is used for both input and output for the problem solving resources that reside in the computer network,—the unitary health language fulfils that role.

I) Detailed Description of the Servo Pre-Consultation Event Collector

System of Operation.

The servo pre-consultation event collector comprises means for the servo driven computer program to collect a competent medical history and perform clinical problem solving, including the steps of
1. collecting and confirming at least one symptom from the patient
2. evaluating the status of the patient
3. collect more symptoms and signs by asking for positive or negative confirmation or having the patient respond "unsure", of the best single candidate question arising from the machine evaluation after each round of patient response.
4. storing each response
5. iterate back to 2.

At any point of the servo consultation, the user may interrogate the machine regarding rephrasing the question, to request for a differential diagnosis, to probe why the question was asked, to list the status of history collected, to list recommended tests and to instruct the machine to change the line of questioning.

At the end, the machine optionally produces a human and computer readable unitary health language output for the manual or electronic medical record administrator.

The servo pre-consulation patient (user)-machine interface that is driven by a minimal set of three responses viz. 1) Yes 2) No and 3) Unsure. Now these commands can be fed back by means of clicking on a Yes/No/Unsure buttons in a desktop application or in a web browser or via voice commands.

Optionally there could be more choices of patient responses such as:
4) rephrase—which gets the computer to explain the question using alternate terms
5) machine—listing of differential diagnosis by the automaton
6) Why—the rationale for asking the question is explained
7) status—history of the patient collected thus far
8) Tests—machine recommended list based on evaluation of symptoms and signs
9) Change line of questioning—jump to different anatomical and pathophysiological drift of questioning, especially if a long series of questioning keeps leading to 'No' type responses
10) Print the contents of the transcription pane.

The servo pre-consultation module poses the most pertinent question one at a time after evaluating the current state of knowledge of a patient's clinical symptoms and signs and taking into consideration the known existing medical history of the patient. This is effected by importing the current patient health status defined in unitary health language.

The iterative evaluation of the patient clinical status is in the global context, all symptoms, signs, existing history of the patient clinical condition is evaluated against all clinical possibilities. The prior art deals with medical diagnosis with a narrow domain of say 'bacterial infections', the prior art involves branching logic which is deterministic. This invention is a non-deterministic finite state automaton where each state can be a 'begin' and 'end' state. In other words an end state can be the begin state of the following session.

For the servo consultation to start, it has to be seeded by at least a single symptom. The first question is seeded by the patient nominating the anatomical region that is the source of his symptom. Alternately, the seeding of the servo consultation program can come from data entered from a picklist or generated from a set of symptoms and signs reserved for the conditional event of the machine running out of questions to ask.

Symptoms associated with that anatomical region are all candidates, candidate selection is then based on the one with the most chance of eliciting a positive response. The candidate question is then posed to the patient—which then has to answer in the affirmative (Yes), negative (No) or Unsure.

Alternatively, the servo pre-consultation can be seeded by symptoms collected from a pick list before the servo consultation is launched. Based on each response, the computer will evaluate the clinical status of the patient. In the preferred embodiment, the evaluation on the patient is carried out using the knowledge spreadsheet query comprising the steps of:
1. collecting and confirming at least one symptom from the patient
2. evaluating the status of the patient
3. collect more symptoms and signs by asking for positive or negative confirmation or respond unsure, of the best single candidate question arising from the machine evaluation.
4. storing each response
5. iterate back to 2

Under the hood of the evaluation step (2) are the following steps:
1. Get listing of presentation (symptoms and signs) events, if listing is empty generate a question from reserved pool of questions.
2. With (1) generate a list of differential diagnoses
3. From list of differential diagnosis in (2), generate list of candidate symptoms and signs.
4. From list of candidates, eliminate those candidates already asked.
5. Pick best candidate from remainder of list in (4).

The automaton is based on a sequence of single modal or obligatory questions, to which the client can respond as Yes or No or Unsure, optionally there are selections of inspecting the machine's logic by such queries as Why or Rephrase, in addition the client is given the option to interrogate the state of the machine thinking on a list of differential diagnoses, list of differential investigations, list of symptoms and signs already established by the machine consultation.

Each of the questions are generated by a servo loop of:
1) machine evaluation of the global patient condition at each step of the consultation
2) machine outputs a candidate question
3) client responds to candidate question—response stored then iterating back to step 1.

This automaton poses the next critical question through a process of evaluation of the whole patient at each point to efficiently establish the differential diagnoses congruent with the history of symptoms and signs collected.

The embodiment of the invention uses a common high level language that both the human and the machine can understand/comprehend/interpret. This commonality of the internal representation of the patient status and as a language of communication at the user interface level results in easier debugging of knowledge representational issues. It also promotes the greater integrity of data input and output. This high level language is termed Docle as previously mentioned and is a language defined like a high level language. It has lexicons joined together with operators to form medical expressions.

Detailed Description of Phases II and III of the Split Consultation Element of the Invention II) The Medical Spreadsheet.

A method of implementing non numerical spread sheets for the medical and legal domains using a computer-assisted iterative problem solving technique which starts from initial non-numerical data and develops possible solutions within a framework of an interrelationship among pre-selected non-numerical data which are divided into a plurality of mutually exclusive categories differentiated according to readiness for decision making, including the steps of:

1. displaying on a video display, a work sheet having a plurality of cells each corresponding to one of said mutually exclusive categories for displaying the non-numerical data;
2. entering initial non-numerical data into respective cells in the work sheet;
3. selecting a query designating at least a first cell in the work sheet with the initial non-numerical data as an input and requesting related non-numerical data for at least one cell of the plurality of cells in the work sheet;
4. identifying non-numerical data for the at least one cell that are related to non-numerical data in the first cell; and
5. inserting the identified non-numerical data into the at least one cell in the work sheet as further information for consideration in developing possible solutions.

III) The Medical Record Administrator/Oversight Phase

A medical record management system administrator may comprise:
1. a data receiver to selectively receive one or more medical files pertaining to a first patient, each file represented in a medical scripting language having predetermined syntactical and semantic constructs;
2. a recorder to record and store each medical file of the patient in terms of the predetermined syntactical and semantic constructs; and
3. a query module to receive a query from a predefined source which has been assigned selective access to the recorded material in terms of the predetermined syntactical and semantic constructs, and to transmit relevant recorded material to that source.

IV) Detailed Description of the Unitary Health Language

The language comprises 1) words classified in a linnean hierarchy and 2) a syntax and semantic structure designed for problem solving.

The classification of the words used in unitary health language modifies the ideas of biological classification started by Linnaeus in the 1750s. One of the central tenets of biological classification is the concept of the species. The other tenets being the hierarchies and the concept of the taxon (plural taxa). A taxon is a group with shared values in each hierarchy. Identifying a new species and placing the new species in the right taxon in the right hierarchy level is a powerful way to cognate new knowledge to old.

The system of classification in UHL is based on the above framework with major modifications. The main deviations from the Linnean model are:—

1) There are more hierarchies defined below the species level. There are the subspecies, subsubspecies subsubsubspecies and subsubsubsubspecies levels already defined.

2) A species or any of its subclasses can have membership in any number of taxa at any level. This is the multiple inheritance feature of Docle.

3) The corollary of the above is that a species may have no membership of any taxon at any specified level.

4) As implemented in Unitary Health language, a taxon knows its membership. A species knows who its subspecies, subsubspecies, subsubsubspecies and subsubsubsubspecies are, if there is any.

5) The taxa at the next level down of the hierarchy does not need to be descendants of a taxon at the current level.

6) The entity to be classified is held as a unitary health object (also referred to as medical object), the name of the object becomes the key to the object.

There are four types of key to these Docle objects. The primary key is the complete key that can look like a textbook name or an expression that looks like an internet address. Example of a primary key is diabetesMellitus. Note the absence of a space between diabetes and mellitus.

The secondary key is computer generated and is an abbreviated version of the first using the Docle algorithm. Hence the secondary key is diabm. A secondary abbreviated key is useful in that healthcare professionals like to communicate in a shorthand manner when possible. It is also a subtle method to get healthcare professionals to standardise on abbreviations.

The tertiary keys are the nominated aliases of the entity.

The quartenary key is the tidied up version of the primary key where hyphens and inappropriate capitalization is parsed away.

To summarise, in the case of diabetes mellitus, the primary key is diabetesMellitus; the secondary key is diabm and the tertiary keys are the aliases: diabetes, sugar diabetes. Example the primary key of bron-chiolitis has the quartenary key of bronchiolitis. In the event of the primary key having no hyphens then the primary and the quartenary keys are the same.

Operators and Symbolic Shorthand

The operators of the language are designed to give the UHL words the power of expression not seen with numeric coding of data. The operators allow the user to combine two or more UHL words or tokens together to form expressions.

There is provision for more operators as there are more than a dozen printable ASCII characters still unused. There are, as currently defined, a dozen operators and several shorthand symbols.

| Operator | Meaning | Example of Use |
|---|---|---|
| . | LOCATED AT | tuberculosis.kidney (tube.kidn) is read as tuberculosis located at kidney. |
| > | LEADING TO | back@pain>buttock (back@pain@butt) is read as backpain radiating to buttock |
| < | DUE TO | pneumonia<virus (pneu<viru) |
| @ | APROPOS | detachment@retina is read as detachment apropos/associated with retina. |
| : | DESCRIBED AS | pain:dull is read as pain described as dull. |
| % | QUANTIFICATION | breast@lump,% 2 cm means lump at breast 2 cm in size. |
| / | INCREASED | chest@pain/swallow (ches@pain/swal) reads as chest pain increases with swallowing. |
| \ | DECREASED | chest@pain\food (ches@pain\food) reads as chest pain decreased with food. |
| = | NORMAL | wcc = reads as white cell count is normal |
| * | ABNORMAL | fbe* |
| *l | ABNORMAL low | wcc*l means whiteCellCount abnormal low |
| *h | ABNORMAL High | wcc*h means whiteCellCount abnormal high |
| & | Code Shear character | &ctx%ill is the contextual organizer |
| , | contextual modifier | ,%2cm is value 2 cm |

The Hierarchies in Docle

1. Kingdom—there is only one taxon located at this hierarchy.

It is named Objects Medica. Objects Medica holds all medical objects and all objects of medical thought.

2. Phylum—the taxa are:
   a) Medical Administration
   b) Symptoms Signs
   c) Diagnostic Non Imaging
   d) Diagnostic Imaging
   e) Procedures Process Of Care
   f) Therapeutics
   g) TAMTAP—(Thinking About Medical Thinking And Practice)
   h) Reason for encounter
   i) Clinical Domains
   j) Context 3. Class—the taxa are the various clinical fields in health (or medicine).

The groups are Adolescent Health, Blood, Cardiovascular etc.

4. Subclass—is reserved for the exciting frontier of genetic medicine. With the complete mapping of the human genome, gene locations/regions can be linked to specific medical syndromes. For example the HLA class II genes is linked to IDDM. We can use taxa such as a) X-linked b) Y-linked. We await a uniform nomenclature for gene maps.

5. Order—the taxa are named anatomical locations and organs.

6. Family—the taxa here are for the biochemical and physiological bases of disease. This can be at the molecular and cellular level. Examples of the groups here are:
   a) Disorders of lipid metabolism
   b) Disorders of the prostaglandins
   c) Disorders of nitrous oxide metabolism
   d) Disorders of heat regulation
   e) Disorders of the mucopolysaccharides
   f) Disorders of cell membrane transport.

The subfamily hierarchy is reserved for taxa related to DRGs and Casemix.

7. Genus—a taxon at this level is a larger concept and holds from 11 to 200 species. Examples of taxa are a) valvular heart disease b) arrhythmia c) fractures d) benign neoplasm e) malignant neoplasm f) intermediate neoplasm.

8. Superspecies—a taxon at this level is a concept that holds 2 to 10 species.

An example of a superspecies is fracture of the femur. It is not specific enough for treatment and prognostication, it contains several species.

9. Species—The root word is the Latin specere which means to look at. At the species level the medical entity is real and can be looked at or experienced by the patient/clinician. A species belonging to the phylum 'Clinical Domains' is a characteristic syndrome with clinical features generally known. Often there is knowledge about its aetiology. There is knowledge regarding diagnosis by clinical and/or non-clinical methods. There exists in many cases a knowledge of its natural history. There is associated a system of management of this syndrome and in many cases methods of prevention. A diagnosis at the species level or better is required for specific therapy. Examples of a species are diabetesMellitus, fracture.femur@neck and acidosis@metabolic. Species belonging to phyla other than Clinical Domain are non-abstract entities such as cough, chest X ray, or a swelling located at neck.

10. subspecies—A differentiated type arising from species, it suggests more specific treatment and prognostication.

11. subsubspecies—A more differentiated type arising from subspecies.

12. subsubsubspecies—A differentiated type arising from subsubspecies.

13. subsubsubsubspecies—A differentiated type arising from subsubsubspecies.

14. subsubsubsubsubspecies . . .

A Case Study—Classification of Fractures Involving the Neck of Femur.

The primary keys are followed by its secondary keys.

The production of these secondary keys are automated by the use of the Docle algorithm kingdom: object medica phyllum: clinical domain class: musculoskeletal order: femur family: disorder of bone metabolism genus: fracture.femur—frac.femu, fracture—frac species: fracture.femur@neck—frac.femu@neck subspecies: fracture.femur@neck@pertrochanteric—frac.femu@neck@pert subsubspecies: fracture.femur@neck@pertrochanteric@avulsion—frac.femu@neck@pert@avul The Classification of Health Contexts The subclasses are accordingly indented:

```
ctx
    &ctx@patient
        &ctx@well
        &ctx@ill
        &ctx@heap
            &ctx@heap@plum@non
            &ctx@heap@admin
            &ctx@heap@plum
            &ctx@heap@social
            &ctx@heap@family
            &ctx@heap@p
                &ctx@heap@p@inactive
                &ctx@heap@p@active
                    &ctx@heap@p@now
            &ctx@heap@l
                &ctx@heap@l@inactive
                &ctx@heap@l@active
                    &ctx@heap@l@now
            &ctx@heap@u
                &ctx@heap@u@inactive
                &ctx@heap@u@active
                    &ctx@heap@drug@allergy
                    &ctx@heap@drug@reaction
                    &ctx@heap@u@now
            &ctx@heap@m
                &ctx@heap@m@inactive
                &ctx@heap@m@active
                    &ctx@heap@drug@active
                    &ctx@heap@drug@inactive
                    &ctx@heap@m@now
    &ctx@eval
        &ctx@imho
    &ctx@plan
        &ctx@protocol
            &ctx@presentation
                &ctx@symptom
                &ctx@sign
            &ctx@links
    &ctx@unity
        &ctx@etiology
        &ctx@prognosis
        &ctx@diagnosis@criteria
        &ctx@sequela
    &ctx@management
        &ctx@resource
        &ctx@goal
        &ctx@goal@walkBack
        &ctx@avert
        &ctx@prevention
        &ctx@prevention@monitor
        &ctx@ill@monitor
        &ctx@drug
            &ctx@adverse@reaction
            &ctx@allergy@reaction
            &ctx@drug@dose
        &ctx@pathology
        &ctx@radiology
        &ctx@ppoc
```

Note: ctx stands for context. p stands for presentation. l stands for links and u stands for unity.

At the top of the context hierarchy is ctx at the phylum level.

The subclass ctx@patient is the patient context. Subclassed from the patient context are the following useful contexts:

&ctx@well—this wellness context is the organizer for contextual modifiers that made the patient well.

&ctx@ill—this illness context is the organizer for contextual modifiers that describes the circumstances that the illness occur.

&ctx@heap—this is the generic organizer for contextual modifiers that are kept track of on an accrual (heap) basis, e.g. list of current medications, active problems.

&ctx@heap@social—this is the organizer for contextual modifiers of the accrual (heap) type that keeps track of social events.

&ctx@heap@family—this is the organizer for contextual modifiers of the accrual (heap) type that keeps track of family history events.

&ctx@heap@active—this is the organizer for contextual modifiers of the accrual (heap) type that keeps track of active presentation events.

&ctx@heap@l@active—this is the organizer for contextual modifiers of the accrual (heap) type that keeps track of active links events.

&ctx@heap@u@active—this is the organizer for contextual modifiers of the accrual (heap) type that keeps track of active unity-diagnosis events.

&ctx@heap@m@active—this is the organizer for contextual modifiers of the accrual (heap) type that keeps track of active management events.

&ctx@heap@drug@active—this is the organizer for contextual modifiers of the accrual (heap) type that keeps track of drugs that are being taken.

&ctx@heap@drug@inactive—this is the organizer for contextual modifiers of the accrual (heap) type that keeps track of drugs that are no longer being taken.

&ctx@heap@drug@allergy—this is the organizer for contextual modifiers of the accrual (heap) type that keeps track of drugs that cause allergy events.

&ctx@heap@drug@reaction—this is the organizer for contextual modifiers of the accrual (heap) type that keeps track of drugs that cause adverse drug reaction events.

&ctximho—evaluation context meaning 'in my humble opinion'

&ctx@eval which reads as context evaluation is the context that deals with patient review and outcome. e.g. the code for patient getting better is &ctx@eval ,better. Other suitable modifiers are ,in StatusQuo ,worse ,cure.

&ctx@plan is the planning contextual organizer. It and its subclasses are used to represent the knowledge and the planning required for the practice of medicine.

&ctx@protocol is the protocol contextual organizer, where definitions in medicine are represented.

&ctx@presention is the contextual organizer for symptoms and signs of diseases.

&ctx@symptoms is the contextual organizer for symptoms of diseases.

&ctx@signs is the contextual organizer for signs of diseases.

&ctx@links is the contextual organizer for links or test results associated with diseases.

&ctx@unity is the contextual organizer for diseases that are associated with other diseases.

&ctx@epidemiology is the contextual organizer for epidemiology of diseases.

&ctx@etiology is the contextual organizer for etiology of diseases.

&ctx@prognosis is the contextual organizer for prognosis of diseases.

&ctx@diagnosis@criteria is the contextual organizer for diagnostic criteria of diseases.

&ctx@sequela is the contextual organizer for sequelae of diseases.

&ctx@management is the contextual organizer for management of diseases.

&ctx@resource is the contextual organizer for resource planning in management.

&ctx@goal is the contextual organizer for goal planning in management.

&ctx@goal@walkback is the contextual organizer for fixing unfulfilled goal planning in management.

&ctx@avert is the contextual organizer for aversion planning in management.

&ctx@prevention is the contextual organizer for preventive planning in management.

&ctx@prevention@monitor is the contextual organizer for periodic prevention monitor planning in management.

&ctx@ill@monitor is the contextual organizer for illness monitoring in management.

&ctx@drug is the contextual organizer for drug in management.

&ctx@adverse@reaction is the contextual organizer for adverse reactions of drugs in management.

&ctx@allergy@reaction is the contextual organizer for allergy reactions of drugs in management.

&ctx@drug@dose is the contextual organizer for dosages of drugs in management.

&ctx@pathology is the contextual organizer for pathology in management.

&ctx@radiology is the contextual organizer for radiology in management.

&ctx@ppoc is the contextual organizer for procedure and process of care in management.

Unitary Health Language in Extended Backus Naur Formalism

This formal definition is based on Extended Backus Naur Formalism (EBNF is discussed in Programming in Modula 2 by Niklaus Wirth, Springer-Verlag, 1982).

EBNF Syntax rules are defined as:

Syntax = { rule }.

rule = identifier "=" expression ".".

expression = term { "|" term }.

term = factor { factor }.

factor = identifier | string | "(" expression ")" | "[" expression "]" | "{" expression "}".

Unitary Health Language is a sequence of syntax rules.

The right hand of each rule defines syntax based on previous rules and terminal symbols.

Parentheses such as ( ) group alternate terms.

The vertical bar | separates alternate terms.

Square brackets [ ] denote optional expressions.

Braces { } denote expressions that may occur zero or more times.

Unitary Health Language Syntax patientFile = "|" { ("|" sectionHeader "|" {proposition "|" }) } "|"

sectionHeader = "#administrative" | "command" | "#action" | "#presentation" | "#links" | "#unity" |"#management" | "#heap"

proposition = ["?" | "!" | "!?"] [date] script [[controller docleExpressionSeries] {contextBlock}] {footnote} [comment] | variableDeclaration.

theme = docleIdentifier {"&"docleIdentifier } | "self" | "dialog".

variableDeclaration = "|" {variable} "|".

script = theme [ plot ].

plot = { subplot }.

subplot = { subplotPrimary } { contextualModifier}.

subplotPrimary = contextualModifier | "(" subplot ")".

scriptSeries = { script "." }.

contextBlock = controller block.

block = '[" scriptSeries "]".

contextualOrganizer = "&ctx%"string.

contextualModifier = ","string["%"string].

controller = { specialContextualModifier }.

contextualModifier = specialContextualModifier | contextualModifier | contextualOrganizer.

specialContextualModifier = ",when" | ",consider" | ",reject" | ",one" | ",mix" | ",all" | ",because" | ","integer | "," integer "_"integer | ",iterate" ",<"integer | ",>" integer | ",=" integer | ",true" | ",false" | ",infer" | ",none".

mathematicalContextualModifier = ",+" | ",−" | ",*" | ",/" | ",//" | ",modulo" | ",and" | ",or" | ",>" | ".","<" | ",>=" | ",<=" | ",<>" | ",=' | ",|"

assignment = variable ",:=" docleExpression.

docleExpression = theme | script | block | "(" script ")" | "(" docleExpressionSeries ")" | "(" assignment ")".

docleExpressionSeries = { docleExpression "." } [[","] docleExpression].

docleToken = {character }.

docleIdentifier = docleToken { docleOperators docleToken }.

variable = "$" docleIdentifier.

footnoteModifier = [ ",parcel%" | ",author%" | ",rank%" | ",reference%" | ",url%" ]

footnote = { footnoteModifier string }.

date = dd mm yyyy.

dd = 01 .. 31.

mm = "jan" | "Jan" | "feb" | "Feb" | "mar" | "Mar" | "apr" | "Apr" | "may" | "May" | "jun" | "Jun" | "jul" | "Jul" | "aug" | "Aug" | "sep" | "Sep" | "oct" | "Oct" | "nov" | "Nov" | "dec" | "Dec".

yyyy = digit digit digit digit. digit = "0" | "1" | "2" | "3" | "4" | "5" | "6" | "7" | "8" | "9".

integer = {digit}.

time = digit digit ":" digit digit [":" digit digit ] ["." digit digit digit] ["gmt"].

comment = "''" { character } "''".

packedString = { character | "_" | "-" }.

string = { character | "''" | "_" | "-" }.

docleOperators = "!" | "<" | ">" | "%" | "@" | "#" | "$" | "%" | "^" | "&" | ",".

letter = capitalLetter | "a" | "b" | "c" | "d" | "e" | "f" | "g" | "h" | "I" | "j" | "k" | "l" | "m" | "n" | "o" | "p" | "q" | "r" | "s" | "t" | "u" | "v" | "w" | "x" | "y" | "z".

capitalLetter = "A" | "B" | "C" | "D" | "E" | "F" | "G" | "H" | "I" | "J" | "K" | "L" | "M" | "N" | "O" | "P" | "Q" | "R" | "S" | "T" | "U" | "V" | "W" | "X" | "Y" | "Z".

character = | letter | digit | docleOperator.

Embodiments of the Unitary Health Language

With the prior art, health coding is limited in scope to disease coding. Whereas this single integral unitary health language of uniform syntax and semantic structure extends the scope of health coding to knowledge representation, coding for heuristics for decision support and for communication among a plurality of problem solving resources in addition to disease classification and coding itself.

The massive improvement in utility of this unitary health language over prior art coding systems such as SNOMED, READ, ICD and ICPC, is derived from an elaborate contextual framework to give each word of the language a place value dependent on its contextual usage. This leads to massive refactoring of the medical words to express an unbounded coding and knowledge space; even though the sum total of the words and contual modifiers themselves are quite limited in number.

The increased utility of this system in health coding is similar to the advance in counting when the mathematician discovers the concept of the place value of number. For example the number 999—has the same number 9 in three different locations, depending on its place the number 9 which has an intrinsic value 9, has a different value. From the basic twelve ingredients of 0 to 9 and the + and − signs, we can express a hugh range of positive and negative numbers.

Each word in an unitary health language expression has a place value component on top of its intrinsic meaning depending on its relationships to a contextual organizer and associated contextual modifiers. The unitary health language is comprised of words organized and classified in a linnean hierarchy. These words are then joined together, subject to syntactical compliance with language EBNF definition, utilising a framework of contextual organizers and contextual modifiers which in effect gives a place value to each of these words, and augments the meaning of the resultant expressions.

An example is the code for egg; it is used in two expressions, in one it describes egg as a cause of life-threatening anaphylaxis and in another in describes a special diet of eggs; where ppoc stands for procedure and process of care and ctx stands for context.

shock@anaphylaxis&allergy@food&ctx@ill,egg ppoc@diet@egg

In one expression, egg explains the patient's illness context, while egg in the second expression is a component of a special diet. This refactoring, or giving the same word different meaning when used in a different context is a feature of this unitary health language. By keeping the vocabulary small, unitary health language is an order of magnitude easier to learn. With just 220 contextual modifiers and a single contextual organizer, UHL codes for 24 billion injury codes. As currently defined, and constantly being added to, UHL has around 20,000 themes, itself constructed from 4000 word tokens. Yet the expressivity exceeds a prior art coding system with 400,000 codes. By adding a contextual framework to disease coding, it is possible to code for any granularity of information level in health coding.

In the same expression, shock@anaphylaxis&allergy@food&ctx@ill,egg , the &ctx@ill is the illness contextual organizer and the ,egg is the contextual modifier. Depending on which contextual organizer the egg is hooked on to, egg has different meanings in these different contexts.

Hitherto the system of disease coding is designed for information retrieval from database systems. This database oriented and data field oriented paradigm is unsuitable for decision support in computer applications for a variety of reasons:

1) Lack of a fine grain structure.
2) Complexity in maintenance
3) Complexity and magnitude of the task of documentation
4) Inability to define data in the correct context.

For example cough has different meaning in different context. These are at least the multiple meanings for 'cough' in the various context that cough is viewed:

1) cough as a presenting symptom of an illness encounter 2) cough as a recurrent symptom of the patient for over a long period 3) cough by a patient on an angiotensin converting enzyme inhibitor for hypertension 4) cough by a newborn delivered just seconds before.

5) cough aggravated by food 6) cough on lying flat on the bed

All variations of the above cough have to be coded differently to express their true characteristics. Coding for various symptoms, signs, diagnosis and medical management and its various contexts as an integral unit as per prior art medical coding systems, will lead to an enormous coding space of millions of codes. This tenacious approach, of combining the disease entity with its associated context into a single code is the prior art. This leads to a proliferation of codes which makes maintenance a nightmare.

This invention is an improved system and method for coding for medical data and knowledge, its methodology is of course not confined to health (or medicine) and can be extended to any other knowledge domain.

The escalation of medical codes such as seen in ICD 10, READ and SNOMED and the library of congress UMLS can be checked using the concept of scripting of medical themes and modifiers already predefined in a linnean multi-inheritance hierarchical framework as outlined above. These predefined words can be constructed to represent simple and complex data with precision suitable for direct human understanding and computer processing.

Knowledge, such as held in medical texts and guidelines can be translated into these scripts, termed unitary health language. UHL employs the concept of propositions, themes, plot, subplot, script series and context block constructions. The problem of data and knowledge representation in health and other domains such as law or engineering is akin to the analogy of data and knowledge representation in English.

In a crude form, we need a lexicon such as an Oxford Dictionary of English which lists all the words, correct spellings and their meanings. We then need syntax and semantic rules to combine the English words into prose or verse or treatises or essays or reports to convey the information.

With the UHL, the linnean classification system of medical terms provides the grist for this invention. This invention is predicated on a language system and method that uses the controlled combinations of these predefined terms which can be themes or modifiers into constructs that can accurately represent medical and non-medical data, knowledge and concept, heuristics and as conversational strings for machine—machine and machine-human dialogs for problem solving.

There is a limited number of species (or special unique) terms in medicine, each species is associated with its unique set of identifying criteria, prognostication and treatment. However there is an infinite variety of variations of these species terms, much like the situation of the species called homo sapiens. There are homo sapiens that work for the bank, homo sapiens that live in the artic regions, the tropics. There are dark skin homo sapiens and there are homo sapiens who are still hunter gatherers. The problem arises from the prior art of attempting to force variants of medical species into their own unique species with each a unique code.

One solution is to limit coding to terms identified as species only and to describe variants using modifiers. Furthermore the modifiers follow syntactical rules and are structured into contextual constructs called plots and subplots. Because there is no limit to the size of the plots and the infinite number of plies of subplots, which enables information tunnelling, there is no limit to the expression of the most complicated ideas and concepts in data and knowledge coding.

The unitary health language is underpinned by words classified in a linnean medical belief system. The contextual words have distinct stigmata, when preceded by the &ctx character string, they are known as contextual organizers; whereas contextual modifiers are preceded by the, or comma character. Non contextual words such as symptoms and signs, diseases, investigations and investigation results, procedures, process of care and therapeutics can themselves by transformed into contextual modifiers by using the comma prefix stigma. These modifier and non-modifier terms are expressed in an all but natural quasi-English expression that is suitable for direct human and computer apprehension and processing.

To allow coding for knowledge representation, the prerequisite is the ability to code for basic events such as medical events using small scale scripting with modifiers construct.

Because all the words in UHL are capable of human apprehension, are non-numeric based and are immediately decipherable, it is unlikely the user will code for nonsensical scripts utilising the wrong modifiers. Unitary health language is compositional. It is possible for the user to add to the coding by appending a user defined value such as:

burn&ctx@ill,area%20% for describing burns covering 20 percent of the body. While the code: burn&ctx@ill, area%<10% means burn area is less than 10 percent.

Contextual Modifiers

Promotion of contextual modifiers to be thematic status. Demotion from thematic staus to contextual modifier status.

for example the ,thread%23 contextual modifier can be made thematic by stripping off the comma , operator to return the thematic thread%23 and used in a statement like:

thread%23 ,end.

Demotion from thematic staus to contextual modifier status: peni-cillin and warfarin are themes, but in the following expression they are contextual modifiers.

drugInteraction&ctx@ill,penicillin,warfarin

Therefore the claim is made that in UHL, the contextual modifiers can be promoted to be themes and there is demotion of themes to be contextual modifiers.

Examples of Medical Coding

The scripting component of unitary health language conforms to the following syntax.

Hence in Extended Backus Naur Formalism, the script is defined as:

script = theme [ plot ].

plot = { subplot }.

subplot = { subplotPrimary } { contextualModifier}.

subplotPrimary = contextualModifier | "(" subplot ")".

scriptSeries = { script "." }.

contextBlock = controller block.

block = "[" scriptSeries "]".

contextualOrganizer = "&ctx%"string.

contextualModifier = ","string["%"string].

controller = { specialContextualModifier }.

contextualModifier = specialContextualModifier | contextualModifier | contextualOrganizer.

specialContextualModifier = ",when" | ",consider" | ",reject" | ",one" | ",mix" | ",all" |
",because" | ","integer | "," integer "_"integer | ",iterate" ",<"integer | ",>" integer | ",=" integer | ",true" | ",false" | ",infer".

contextualModifier = specialContextualModifier | contextualModifier | contextualOrganizer.

A unitary health language script is a powerful method for coding a medical event. The script comprises a theme, a plot construction by appending a predefined contextual organizer and contextual modifiers and optional series of subplots embedded in parentheses. Information tunnelling is achieved using the subplot construct. As infinite layers of subplotting are allowed, very detailed description of events without fear of contextual confusion is obtained.

An example is that of coding for injury as a theme.

The example given is that of the contextual organizer &ctx@ill and its associated contextual modifiers which are stigmatised by the comma prefix:

injury&ctx@ill ,driver ,motorCarAccident ,collision@headOn ,speed%80kph (,truck ,speed%100kph)

The contextual organizer can be a theme itself, hence the following can be coded as two separate expressions:

injury

&ctx@ill ,driver ,motorCarAccident ,collision@headOn ,speed%80kph (,truck ,speed%100kph)

As the & character is the predefined code shear character, the earlier expression is easily sheared into its component expressions for analysis by the computer interpreter.

Plots are just a sequence of modifiers, whereas subplots are enclosed in parentheses.

Subplots modifies the behaviour of the modifiers at the information level that they occur at. Some demonstrations of theme, plot and subplot constructions The example is that of a car driver that got injured in a car traffic accident during which the car collided head on with a truck, travelling at 80 kph and 100 kph respectively.

injury&ctx@ill ,driver ,motorCarAccident (,collision@headOn (,car ,speed%80kph) (,truck ,speed%100kph))

Below is another example, this time it is the truck driver that got injured in the same traffic accident as above during which the truck collided head on with a car travelling at 100 kph and 80 kph respectively. An extra layer of information tunnelling is used to describe the sex of the driver of the other vehicle as male, aged 18 and his car was red.

injury&ctx@ill ,driver ,truck ,accident@traffic (,collision@headOn ((,truck ,speed%100kph) (,car ,speed%80kph ,red (,driver ,male ,age%18))))

the above information regarding the injury of the truck driver can be represented as a indented layered contextual information diagram below, note that the subplot mechanism is used to embed the information about the driver of the car being male and is aged 18:

injury
&ctx@ill
,driver ,truck
,accident@traffic
,coll-ision@headOn
,truck ,speed%100kph
,car ,speed%80kph ,red
,driver ,male ,age%18

What happens when it is two trucks colliding head on? The protagonist context modifier ,prot-agonist is used to distinguished it from the other truck. The injured patient's truck was travelling at the sedate pace of 60 kph. Example below shows the other truck driver was aged 80 and travelling at 120 kph.

injury&ctx@ill ,driver ,truck ,accident@traffic (,collision@headOn ((,truck ,speed%60kph ,prot-agonist) (,truck ,speed%120kph (,driver ,male ,age%80))))

As a indented layered, the contextual information diagram below:

injury
&ctx@ill
,driver ,truck
,accident@traffic
,coll-ision@headOn
,truck ,speed%100kph
,car ,speed%80kph ,red
,driver ,male ,age%18

It is possible to add information such as ethanol levels to the party involved if required. This scripting shows the possibility of coding for public health and medical research utilising these constructs. For example there are over 24 billion potential combinations for the coding of injuries using just four modifiers out of a range of 220 modifiers combined with the 250 basic injury codes. The 250 injury codes stem from the generic (genus) concept of injury plus 249 types of injury associated with each specific anatomical site using the dot or located at operator variants.

Examples:

injury injury.brain injury.foot injury.finger injury.eye

In addition there are now at least 220 contextual modifiers for the injury, these specify how the injury took place, notated such as: injury &ctx@ill ,driver ,motorCarAccident The above expression can be written as: injury&ctx@ill, driver,motorCarAccident as the computer parser ignores the spaces.

With the case of using the modifiers, without repetition of each modifier, all the possible permutations can be calculated using the nCr formula of $nCr:=n!/r!(n-r)!$ This standard formula describes the number of selections of n different objects taken r at a time. That is, the number of r subsets that can be formed from an n set. As the number of permutations of modifiers that can be recruited from the pool of 220 for categories of 1 to 4 modifiers, the total number of permutations are:

220C1=220

220C2=24090

220C3=1750540

220C4=94,966,795

Therefore the number of selections possible is

220+24090+1750540+94966795:=96741645 given the number is restricted to the range from 1 to 4 out of the pool of 220.

Based on the use of up to four modifiers, the possible number of injury codes is: 96741645×250=24,185,411,250 potential Docle codes for injuries. If we add the 250 injury codes that have zero modifiers, we get the grand total of 24,185,411,500. That is over 24 billion codes for injury alone, but of course these include codes for all types of sporting injuries inclusive of all Olympic sports events.

Needless to say, when eight modifiers are specified, the potential number of codes will be astronomical, all these without the use of the subplotting construct.

The sensible objection is the question as to whether we need such a detailed coding system. A closer inspection is that we do not have that many codes. We have only a collection of 250 injury codes. A generic code for injury and as there are currently defined 249 anatomical structures, there is a grand total of 250 types of injuries all linked via an anatomical belief system.

The important concept here is the breaking down of a coding exercise into the main theme and its nuances (plot) and an infinite depth of micronuances(subplots) when the situation arises. The elegance of this solution is that we can define the scripting and its lexical elements and yet restrict the use to only a tiny subset of the definitions if there is any irrational fear of overcoding.

The modifier plot/subplot construct allows the formation of scripts with tenuous rather than tenacious links as in the ICD scheme. In the latter case, any discriminant such as 'pedestrian' and 'traffic accident' are tenaciously bonded together in a serious of compounded expressions each tenaciously mapped to a single arbitrary and mainly numeric code.

Managing change in health (medicine) needs a 'tenuous' rather than a 'tenacious' stance, the tenuous and flexible method in this scripting language allows for graceful development of coding expressions to express new ideas and subtle nuances needed by the researcher. The other advantage of this tenuous approach is the ability to analyse the UHL script at its various subcomponent level. For example the UHL script: injury.head&ctx@ill,motorCarAccident, driver can be retrieved and analysed at the subcomponent of injury, injury.head, motorCarAcident, driver and any permutations of the subcomponents. With subplotting information is tunnelled under a lower level, similar to a city multi-level carpark:

(,bite (,man ,dog))—in this subplot we are not sure who bites who, someone got bitten (,man ,bite ,dog)—in this subplot it is clear man bites dog as the actor precedes the object with the verb interposed.

The advantage is that the string regular patterns are easy to search and patients fulfilling search criteria can be easily located.

The Context Conflict Catcher

The words used in the unitary health language coding system and the modifiers are in all but natural language—a quasi English, any contextual errors can be spotted by an alert user. UHL is suited for automating the context conflict detection called a Context Conflict Catcher:

It is a program written to vet for the correctness of the UHL scripting.

It catches logical errors such as a code for:

injury &ctx@ill ,driver ,pedestrian

The above scripting has a theme called injury. The ,driver and pedestrian contextual modifiers at the same information level is incongruent and is flagged as error. One way of catching contextual conflicts is to limit the possibilities of modifiers used in actual coding practice. For example, when the coder selects injury, the user is prompted for the location of the injury, then the user is prompted for traffic or non-traffic type injury, the type of vehicle, whether the patient is a passenger or driver or pedestrian etc., this limits the potential for contextual conflicts yet because of the availability of this contextual modifier construct allows choice for the investigators involved in a research project.

Another way of catching contextual conflicts is to employ a dictionary of incongruous terms that are stored as associations, such as the association of ,driver with ,pedestrian—both being incongruent at the same information level.

Another incongruent association is that of ,driver with ,passenger at the same information level.

Another way of catching context conflicts is the used of patterns. Problematic conflicts are documented and stored as a set of "dirty character strings". Vetting for correctness involves matching the dirty strings with the putative script, if it matches then the script is flagged as suspect. Efficiency can be improved by pre-sorting the alphanumeric collating sequence of these strings.

Another type of catching the contextual errors is to parse the script and detect a conflict with the linnean medical belief system under which all the words of the unitary health language is classified.

This invention comprises means for an attachable and detachable healthcare contextual coding framework in the field of healthcare coding. These contextual frameworks are classified in a hierarchy. Each patient and/or illness context comprises means to code to a level near natural language expressivity by the application of contextual modifiers.

Adding Context to Unitary Health Language.

Context modifiers work only in the framework of defined contexts, for example the contextual modifier ",combat" could describe an illness context &ctx@ill such as injury or a context describing a pathology context &ctx@pathology of white cells combating germs under the microscope. Hence the complete meaning of combat is derived from its association with the specific contextual organizer.

The Unitary Health Language Extensible framework

The extensibility framework is derived from the recruitment of non contextual modifiers into contextual modifier status by prefixing with the comma operator.

An example is the code for diabetes mellitus, diabetesMellitus—can be used in the context of an event describing the patient illness. Alternatively the same disease code diabetesMellitus can be used as a contextual modifier itself to code for a family history of diabetes mellitus.

&ctx@heap@family,diabetesMellitus to describe family history of diabetes mellitus.

Another example of the extensible framework is the coding of drug allergies:

Instead of generating new codes for drug allergy, contextual coding is used.

The example is that of the patient who is allergic to penicillin and warfarin.

The word 'heap' denotes an accrual context. The heap context is an efficient language construct to group related bits of information together, the decision support system needs to know the list of drug allergies rather then search the whole patient record to assemble the same information.

This extensible method is efficient, as new drugs are introduced there is only a need to code for the new drug. There is no need to designate a specific code for that particular drug allergy.

&ctx@heap@drug@allergy,peni-cillin,warfarin

Likewise the coding of drug interactions and adverse drug reactions use this extensible framework. Using the concept of illness context organizer and the names of the drugs as contextual modifiers, it is possible to code for any adverse drug reactions:

adverseDrugReaction&ctx@ill,maxolon and drug interactions:

drugInteraction&ctx@ill,penicillin,warfarin

More Examples in Injury Coding

Note the & operator is the code shear operator, expressions can be broken down into their respective substrings for computer parsing, with & as the beginning of each substrings.

injury&ctx@ill,aircraft@comb-at,peace—injuries associated with warplanes in peacetime.

Alternatively the above can be coded as 2 separate entities of injury and the illness context, this demonstates the tenuousness and compositional nature of the unitary health language:

injury and

&ctx@ill,aircraft@comb-at,peace

Injuries in combat aircraft can also occur in wartime, hence:

injury&ctx@ill,aircraft@comb-at ,war—injuries associated with warplanes at war.

Alternatively the above can be coded as 2 separate entities:

injury

&ctx@ill,aircraft@comb-at,war

A researcher looking into combat aircraft injuries needs to seek out entities with the pattern 'aircraft@comb-at' associated with an illness context coded as &ctx@ill.

injury&ctx@ill,school@excu-rsion—injuries sustained during school excursions

Alternatively the above can be coded as 2 separate entities:

injury

&ctx@ill,school@excu-rsion injury&ctx@ill,cycl-ing,helm-et@non—injury sustained while cycling without helmet Alternatively the above can be coded as 2 separate entities:

injury

&ctx@ill%cycl-ing,helm-et@non injury&ctx@ill,driv-er,accident@traffic,coll-ision@rear@server—driver hurt is guy or gal who drove into the rear of another vehicle. This might be relevant in a study on whiplash.

Alternatively the above can be coded as 2 separate entities:

injury

&ctx@ill,driv-er,accident@traffic,coll-ision@rear@server injury&ctx@hill,driv-er,accident@traffic,coll-ision@rear@rece-iver—driver hurt is driver whose rear has been hit. This might be relevant in a study on whiplash.

Alternatively the above can be coded as 2 separate entities:

injury

&ctx@ill,driv-er,accident@traffic,coll-ision@rear@rece-iver injury&ctx@ill,pass-enger,rear,accident@traffic,coll-ision, pole—passenger hurt is sitting behind the driver. This might be relevant in a study on studying which spot is safer for the passenger when a car wraps itself around a lamp post.

injury&ctx@ill,occu-pant,car,motorCarAccident,coll-ision@rear@receiver(ctx@ill%coll-ision@rear@server ,driver,male,age%17)—occupant hurt in car which is recipient of a hit from behind. The driver who drove into the patient's car is male and age 17. This might be relevant in a situation where the minutiae of injury coding can be drawn out for the good of the public health. If we get a rash of paraplegics or serious head injuries from 17 year olds serving up bad rear end collisions, something can be done quickly. This is an example of information tunnelling using subplot construction.

These standardized UHL scripts can/should be composed on the advice of the relevant expert authorities to extract maximal relevant information possible for public health and the common good with the least input effort (clever computer front ends) and the end user need never see the UHL scripts as such. The design of UHL is an extensible and easily scaleable framework that can respond to quick changes by adding a handful of modifiers to reflect public health changes, e.g.: in the Australian injury context, Timor (&ctx@ill,timor) or Vietnam (&ctx@ill,vietnam) context modifiers may be required in the future.

These examples show the benefits of a self descriptive coding system, for instance a search for the patterns '&ctx@ill' and ',bicycle' will extract all the cases of accidental injuries and other illness context associated with the bicycle—this is called "lazy parsing" as we search and collect meaningful cases from dumb string matching. The coding system is augmented by classifying the context modifiers in a linnean hierarchy.

This is to be contrasted with tradition numerical systems where the lack of "regular patterns" means that the authors of decision support software cannot use the technique of lazy parsing whereby pattern or string matching searches are used to locate potential candidates fulfilling the required criteria. This also means that the moment a single new ICD code is issued, the analytical tools for ICD diseases are deprecated. To update the analytical tool to the level of correctness, each new ICD code has to be analysed, its impact on every subroutine of the analytical machine needs to be assessed and each subroutine has to be individually updated.

For example the context modifier occupant 'knows' that it comprises the context modifier for ,passenger and ,driver— using subclassing. A series of context modifiers is placed end to end if they are all at the same information level. The comma, operator is the context modifier character and serves to help the parser to break up the modifiers.

&ctx@ill,accident@traffic,occupant

To code for a pneumothorax of an occupant in a car accident:

pneumoThorax&ctx@ill,motorCarAccident,occupant

OR as two independent entities pneumoThorax ctx@ill,motorCarAccident,occupant

As pneumoThorax is subclassed from injury.chest , a search for chest injuries with the illness context of motor car accident would correctly return the patient with the above code.

Attachable/Detachable Contexts and Modifiers and Polythematic Constructs

We can have polythematic constructs using the & operator. For example, the following two codes can be rolled into one by detaching the illness context and re-attaching it to describe the two themes.

injury.head &ctx@ill ,motorCarAccident injury.abdomen &ctx@ill ,motorCarAccident injury.head &injury.abdomen&ctx@ill ,motorCarAccident Blessing Levels as Denoted by the ,rank% contextual modifier.

Any decision support system operates on the basis of ranking of options, one way is to attach blessing levels to each investigative or management option. The rank contextual modifier has a % or value operator. The number is a real number which range from −1.0 to +1.0. A level near 1.0 means a highly beneficial option approaching total /success in elucidating condition. While a number approaching −1 is a highly toxic, fatal option in management/waste of time and money as a diagnostic avenue.

The blessing level ranges from −1 to +1.

A range of 0.8 to 1.0 means highly recommended, state of the art.

A range of 0.6 to 0.8 means recommended.

A range of 0.4 to 0.6 means somewhat recommended.

A range of 0.2 to 0.4 means mildly recommended, evidence is there but weak or early.

A range of 0.0 to 0.2 means zero or flimsy evidence it might do some good.

A range of −0.8 to −1.0 means highly contraindicated, absolute contraindication, definite hurt to patient.

A figure close to −1.0 means that outcome is fatal or near fatal.

A range of −0.6 to −0.8 means contraindicated, good chance patient will get hurt from this treatment.

A range of −0.4 to −0.6 means somewhat contraindicated, moderate chance patient will be hurt.

A range of −0.2 to −0.4 means generally frowned upon, mild to moderate chance it may harm the patient.

A range of 0.0 to −0.2 means flimsy evidence that it might do harm.

Examples of this notation are given below where a rank level of 0.8 is given to one treatment option while the other received 0.6 ppoc@antibiotic@endocarditis@prophylaxis
&ctx@plan@resource ,consider ,one
  [ amoxycillin ,dosage%3g ,route%oral ,stat ,prior%1hr ,rank%0.8.
    peni-cillin ,dosage%1.5mu ,route%im ,prior%1hr ,rank%0.5.
  ].

Re-Aggregation of Codes

Patient has multiple diagnostic codes; sometimes the researcher like to concentrate on selected patients who qualify by passing the multiple criteria. following three injuries injury.chest &ctx@ill ,motorCarAccident ,seatBelt@non injury.head &ctx@ill ,motorCarAccident ,seatbelt@non injury.abdomen &ctx@ill ,motorCarAccident can be automatically reaggregated into the following correct logical derivatives:

injury &ctx@ill ,motorCarAccident injury.chest& injury.abdomen& injury.head &ctx@ill ,motorCarAccident injury.head&injury.abdomen&ctx@ill ,motorCarAccident injury.chest& injury.abdomen&ctx@ill ,motorCarAccident injury.chest& injury.head&ctx@ill ,motorCarAccident ,seatbelt@non UHL design allows these reaggregation of codes to be automated—this will benefit scientists by speeding up multivariate analyses of their research data, an example being which combinations of drugs are superior in cardiac failure.

Re-Aggregation of Heap Contexts

Accrual contexts which are notated as heaps are collections of patient data that are continually updated as the patient seeks attention in a serial time line from one or more health workers.

UHL heap context comprises means for re-aggregation.

Below may be the heap contexts of a intercity commuter from one doctor in Brisbane 1 jul 2000 &ctx@heap@drug@active ,consider [ enalapril . aspirin. allopurinol ].

1 jul 2000 &ctx@heap@u@active ,consider [ hypertension. hyper@uricAcid ].

1 jul 2000 &ctx@heap@drug@allergy ,consider [ penicillin. sulf-onamide ].

and another in Sydney 1 jul 2000 &ctx@heap@drug@active ,consider [ metformin].

1 jun 2000 &ctx@heap@u@active ,consider [ diabetesMellitus . obesity ].

1 may 2000 &ctx@heap@drug@allergy ,consider [ roxithromycin ].

sees a doctor in Melbourne where the heap contexts are automatically reaggregated into:

26 nov 2000 &ctx@heap@drug@active ,consider [ enalapril . aspirin . allopurinol . metformin ].

26 nov 2000 &ctx@heap@u@active ,consider [ hypertension . hyper@uricAcid .diabetesMellitus . obesity].

26 nov 2000 &ctx@heap@drug@allergy ,consider [ penicillin . sulf-onamide . roxithromycin].

Universal Health Language Use in Decision Support, Heuristics (*

UniversalBeliefSystem—sum total of all computer systems in the network.

LocalBeliefSystem—belief system held on desktop or mobile computer.

self = the theme.

,consider it may be one, mix or all consider [| | ,one | ,mix [,number] | ,all].

,when Boolean expression

,when [| | ,one | ,mix [,number] | ,all] [,false ,true ]

*)

The embodiment of a heuristic in health (or medicine) with UHL is the proposition as defined in EBNF. The structure of the proposition is straightforward. There is an optional date component as to when the proposition was made. This is then followed by the theme. The theme is usually a diagnosis such as diabetesMellitus. The purpose of the proposition is then determined by a contextual organizer such as &ctx@presentation which is the context of symptoms and signs. Next there is the special contextual modifier ,consider to be followed by a block of scripts. A block is similar to a compound statement, that is one statement comprising a series of statements. In the example below, the script on weight@loss is expanded upon by contextual modifiers stating its specificity and sensitivity in the diagnosis of diabetes mellitus. The UHL embodiment for associating presentation to a diagnosis:

23 jul 2000 diabetesMellitus &ctx@presentation ,consider
[weight@loss,specificity%.3,sensitivity%.9.
mouth@dry,specificity%.1,sensitivity%.4].
Associating a links to a diagnosis 23 jul 2000 diabetesMellitus &ctx@links ,consider
[s@glucose*h ,specificity%.8,sensitivity%.9.
s@hba1c*h ,specificity%.9,sensitivity%.9].
Associating management to a diagnosis 1 jul 2000 endocarditis@bacteria &ctx@management ,consider ,all [ ppoc@intravenous,duration%4week_6week.
referral@specialist@infection.
referral@specialist@hear-t.
mc@blood,%3 ].

The next proposition demonstrates that the controller modifier ,consider can be further modified by the ,all contextual modifier; thereby specifying all three drugs are to be used.

1 jul 2000 endocarditis@bacteria &ctx@management

,consider ,all [
  penicillin@benzyl ,dose%1.5g ,frequency%1di ,duration%4week.
  cloxacillin ,dose%2g ,frequency%1di ,duration%4week.
  gentamicin ,dose%2mg/kg ,frequency%8hi, duration%1week.
].

The next example shows the addition of blessing level, the authorship of the proposition and its parcel category. With membership of parcel category, it is possible to parcel in or out a specific collection of propositions associated with a particular person or institution to change the belief system.

1 jul 2000 infection<helicobacter@pylori &ctx@management
,consider,all [ clarithromycin ,dose%500mg ,frequency%8hi ,duration%1week.
omeprazole ,dose%40mg ,frequency%24hi ,duration%1week.
amoxycillin ,dose%500mg ,frequency%8hi ,duration%1week.]
,rank%0.9,author%ykOon ,parcel%docleSystem.

The proposition below shows the controller docleExpressionSeries that in the event that patient is made sick (allergic or adverse reaction) to penicillin then to consider one option from the block comprising the scripts for gentamicin and vancomycin.

1 jul 2000 endocarditis@bacteria &ctx@management
,when (&ctx@ill,peni-cillin)
,consider ,one [
vancomycin ,dose%1g/24hi ,route%iv ,duration%1week ,rank%0.7.
gentamicin ,dose%2mg/kg ,route%iv ,duration%1week ,rank%.b 08.
].

Another way of writing a proposition when there is problem with penicillin, this time there is a context block to reject peni-cillin.

1 jul 2000 infection.chest &ctx@management
,when (ctx@ill,peni-cillin)
,consider[ [ eryt-hrocin . tetracycline . roxi-thromycin ]
,reject [penicillin ].

Writing a proposition to warn against the use of ace inhibitor when patient is hypertensive and pregnant.

1 jul 2000 hyperTension &ctx@management
,when (pregnancy)
,reject [angiotensinConvertingEnzymeInhibitor ].

Going one better, this proposition explains why ace inhibitor is bad.

1 jul 2000 angiotensinConvertingEnzymeInhibitor
,when (pregnancy)
,reject [self ]
,because[ birthDefect.
abortion.
].

Associating a diagnosis with another diagnosis diabetesMellitus &ctx@unity ,consider [ cataract ,associativity%0.3 ]

Associating a diagnosis with another diagnosis rheumatoidArthritis &ctx@unity ,consider [ amyloidosis ,association%0.05
,associationReversed%0.2 ]

Associating attributes to a disease object.

In the event that there is no explicit theme in the scripts of the context block and that the theme in the context block is really the theme of the proposition, then the special theme called self is used.

23 jul 2000 diabetesMellitus ,consider [self ,payOff%.8, incidence%.04 ].

Programming for Contraindication.

1 jul 2000 warfarin
,reject [aspirin ]
,because[
coagulationDefect
].

The proposition below is a classic drug interaction statement.

1 jul 2000 betaBlocker
,reject [diabetesMellitus ]
,because[ &ctx@ill,worse ].

The proposition below states that an elevated psa reading does not count for much in a smoker.

1 jul 2000 prostateSpecificAntigen*h
,when (smoker)
,reject [ self]
,because[ artefact ].

Proposition for preventive care in kidney failure patients undergoing dental work, the proposition gives a reason for its recommendation.

1 apr 2000 renalFailure ,when (surgery@tooth)
,consider [ ppoc@antibiotic@endocarditis@prophylaxis ]
,because [ endocarditis@bacteria ].

1 apr 2000 valvularHeartDisease ,when (surgery@tooth)
,consider [ ppoc@antibiotic@endocarditis@prophylaxis ]
,because [ endocarditis@bacteria ].

Propositions below are used for teaching the drug theme called ciprofloxacin.

ciprofloxacin ,ctx@adverseReaction ,consider [ abdomen@pain ,incidence%0.02 ].

ciprofloxacin ,reject [ iron ],because [ absorption@poor ].

ciprofloxacin ,ctx@drug@dose ,consider [self, dosage%250mg@12hi ].

ciprofloxacin ,ctx@drug@dose ,when (age@child) ,consider [,dosage%125mg@12hi ].

ciprofloxacin ,consider [self ,tradename%ciproxin , ].

Propositions can also be used for resource planning as in "procedure process of care" or ppoc by expanding the procedure into drug specifications. Here a choice of antibiotics is notated for prophylaxis of bacteria endocarditis:

ppoc@endocarditis@antibiotic@prophylaxis
&ctx@plan@resource ,consider ,one
   [ amoxycillin ,dosage%3g ,route%oral ,stat ,prior%1hr.
     peni-cillin ,dosage%1.5mu ,route%im ,prior%1hr.
   ].

Another example of planning: averting an unpleasant outcome in a series of propositions to being about a favourable outcome for diabetes mellitus by averting unpleasant complications:

diabetesMellitus &ctx@avert [ retinopathy . peripheralVascularDisease ]
   ,consider [ self &ctx@goal ].

diabetesMellitus &ctx@goal ,consider
   [ s@glucose= . s@hbalc= . s@creatinnine= ].

The proposition below states that serum glucose is defined as normal when it is between 5 and 9 mmol/l.

s@glucose= &ctx@protocol ,when (self ,%>5.0mmol/l, %<9.0mmol/l).

diabetesMellitus &ctx@avert [ retinopathy ],consider
   [ s@glucose=.
     s@hbalc =.
     bodyMassIndex=.
       referral@specialist@eye ,frequency%1yi. ].

diabetesMellitus &ctx@ill@monitor ,consider ,all
   [ s@glucose ,frequency%1wi.
     s@hbalc ,frequency%4wi.
   ].

diabetesMellitus &ctx@plan@goal ,consider [s@glucose= , >5.0mmol/l,<7.5mmol/l ].

surgery@appendix@extirpation &ctx@plan@goal ,consider [ walking@unassisted ,days@post@surgery%2 ].

"if not walking by day 2 then possibility of post-op infection"

The proposition below is a heuristic to rectify a goal failure, with probability listings.

surgery@appendix@extirpation &ctx@goal@walkBack , when ,false(walking@unassisted ,days@post@surgery%2), consider
   [ infection@wound ,probAbility%0.2.
     infection.lung ,probAbility%.1.
     thrombosis@vein ,probAbility%.05.
   ].

The following proposition is about the apgar score as another example of tracing for faults when with goal failure type planning.

apgar &ctx@goal ,consider [ apgar= ].

apgar &ctx@goal@walkback ,when (apgar*1)
   ,consider [airway@obstruction . opiod@drug . acidosis . hypo@volemia.

congenitalHeartDefect . cerebralPalsy ].

UHL codes for problem solving heuristics such as setting up management goals:

surgery@coronary@graft &ctx@goal ,post-op,%2 day ,consider ,all (urine@toilet@selfl | bowel@open | urine@output, %>2l/day)

surgery@coronary@graft &ctx@goal ,when ,false (bowel@open),consider [ fecal@impaction . hypo@kalemia ].

surgery@coronary@graft &ctx@goal ,when ,false (urine@ouput,%>1l/day),consider [ renalFailure ].

surgery@coronary@graft &ctx@goal ,consider ,all [ exercise@asymptomatic . angiography= ].

UHL is ideal for setting up protocol for health care management such as in antenatal care:

pregnancy &ctx@plan@protocol ,consider [ ppoc@consultation ,first ,<8weeks].

pregnancy&ppoc@consultation,first ,consider [ ppoc@history ,obstetric ,birthControl ].

pregnancy &ctx@plan ,when (rh@negative)
   ,consider [serology@coombs ,at%36week ,at%38week ].

pregnancy &ctx@plan ,when (gestation ,at%30week)
   ,consider [s@hemoGlobin ].

pregnancy &ctx@plan ,when (gestation ,at%26week)
   ,consider [s@glucose@fasting ].

ppoc@consultation@pregnancy &ctx@protocol
   ,consider [ ppoc@weight . ppoc@examination@abdomen . ppoc@bp . test@urine
]

The above is self apparent to any obstetric oriented healthcare professional.

UHL is useful for definition of diagnostic criteria.

nephrotic@syndrome &ctx@protocol ,when ,all (proteinuria ,%/>2g/d | edema | s@albumin*1) ,infer [ self].

Note the flexibility of the controller expressionSeries while gives the following flexibility to code for a) when one b) when all c) when a mix of d) any specified number e) when none. This is more powerful than the usual AND and OR Boolean logic.

diabetesMellitus &ctx@protocol ,when (s@glucose@fasting ,%>7.mmol/l) ,infer [ self ].

UHL can be used to describe the natural history of disease and its sequelae.

The following two propositions allow a decision support program to infer from one disease state to another.

diabetesMellitus &ctx@sequela ,consider [ cataract . renalFailure ].

cataract &ctx@sequela ,consider [ blindness ].

UHL and the personalization of heuristic, the wellness context: &ctx@well.

There are individual patient differences in every disease, making medical care complicated.

Often physicians need to notate what works well with a patient's particular illness. The following code for a migraine sufferer who responds to metoclorpamide and pethidine.

migraine &ctx@well ,pethidine ,metoclorpamide

UHL is designed to track down sources of reference of heuristics with provision for stating source of reference and uniform resource locator on the web.

atrialFibrillation &ctx@management ,consider [ warfarin ],reference%(archive of Internal Medicine 1994; 154:1449–1457),url%(www.docle.com.au)

Declarative Facts 1 jan 2000 diabetesMellitus ,presentation ,weight@loss , sensitivity%0,9 ,specificity%.3 ,author%'yk oon' , kbid%stillpointResearchCentre 2 jan 2000 diabetesMellitus &ctx@epidemiology , malaysia ,incidence%0.07 "seven in one hundred people has diabetes mellitus",author%'yk oon' , kbid%stillpointResearchCentre uhl ,smalltalk%[program],eval
    ,java%[program],eval
    ,javascript%[program],eval
    ,doclescript%[program],eval will cause the program to be executed with the appropriate interpreter.

Examples below are propositions regarding disease prognosis. Contexual modifiers are essential in medicine as values are fuzzy all the time and important decisions made based on these fuzzy bits and pieces of incomplete information e.g.:

carcinoma.breast &ctx@prognosis ,realistic , survivalRate%50%@5yi carcinoma.breast &ctx@prognosis ,pessimistic , survivalRate%30%@5yi carcinoma.breast &ctx@prognosis ,optimistic , survivalRate70%@5yi Example of Etiology toxicity@boneMarrow &ctx@etiology ,consider [ methotrexate . chlor-omycetin ].

Machine Dialog with Universal Health Language.

The proposition below gives the formula for body mass index. UHL comprises means for variable declaration, assignment and mathematical operations.

bodyMassIndex &ctx@protocol ,consider [ (patient , weight)/((patient ,height),**2)].

bodyMassIndex *h &ctx@protocol ,when [ self,>0.3 ]

bodyMassIndex *l &ctx@protocol ,when [ self,%<0.2 ]

bodyMassIndex *h &ctx@protocol ,infer [ obesity ]

obesity &ctx@protocol ,when (bodyMassIndex *h).

Based on the above propositions, it is possible to have a dialog in UHL.

A dialog needs to be started. The following are messages for a dialog session.

The messages could be between two problem solving resources on the internet, on a local computer network, inside a multiprocessing desktop or among programming objects within a single application process. Here the UHL dialog is logged on a transcript window between a human and a problem solving resource. The dialog theme has the following self explanatory contextual modifiers:

dialog ,start.

dialog ,pause.

dialog ,end.

dialog ,reset.

Below is log a man machine dialog about bodyMassIndex calculation in a UHL transcript window, comments are placed in double quotes. A ? asks for evaluation, while the ! character is the response given by the problem solving resource. When a response by the system is a query, it looks like !?. While this dialog looks dated in the year 2000, these string messages can be the basis of intelligent behaviour in applications with sleek graphical user interface or speech activated applications:

dialog ,start.

height ,%1.5m "the ,% is the contextual modifier for value"

weight ,%90kg

?

"user chooses ? for triggering evaluation.

Both height and weight are contained in the body mass index heuristic which is then applied."

! bodyMassIndex ,%0.33

Evaluation can be invoked by prefixing a ? mark before the proposition.

? bodyMassIndex*h "this asks the system to evaluate bodyMassIndex abnormal high"

"Using the protocol: bodyMassIndex *h &ctx@protocol , infer [ obesity ]"

! obesity

Community of Problem Solving Resources which Utilizes a Bi-Directional Unitary Knowledge Scripting Language.

System of Operation

The framework for the Problem Solving Community is based on the simple concept of passing strings of characters among the plurality of problem solving resources distributed over a communication network such as a local network or an internet network. There are numerous protocols for computer processes to communicate with each other over a communications network. Hence sending/receiving messages based on a string messages of ASCII character is not a barrier to the implementation of this community of problem solving resources.

In one embodiment, two problem solving resources are connected to each other using proxies called object request brokers, they talk to each other by specifying the IP (internet protocol) address, port number and process ID. The object request broker supports i) rmi-API for remote method invocation and ii) remote-object-API for remote object managing. Each of any two brokers can establish i) both client and server functions ii) client functions only iii) server functions only. There is no barrier to a problem solving resource having concurrent sessions with other brokers. A dialog between any two problem solving resources may occur via the steps of:

1) The server broker listens for a client connection on a specified port.

2) The client will issue a connection request incorporating an IP address and Port number on the server.

3) A connection established over the connected socket.

4) Client activates a server object over the socket.

5) Dialog between the two brokers over the connection socket using messages written in unitary knowledge scripting language 6) Connection closed.

Concept of a Dialog

Not all conversations are a dialog. A Dialog or consultation has the following characteristics:
agrees that there is a problem to be solved
has an agreed problem solving framework (and often a good problem solving approach)
equal collaborating objects—use same language (for example, UKSL, or UHL)
a Mutual respect, democratic, willingness to listen to each other. This is evidenced by changes in its own or the other object's belief system.

Each dialog object has a belief system undergoing incremental change with each dialog event.

This open dialogical community conducted in UKSL (or, for example, UHL) creates the possibility of allowing electronic postings on a bulletin board by these problem solving resources without human mediation. See below for example. Because all dialogical transactions are logged by a date stamp and marked with a thread identifier, there exists a ready dialogical repair mechanism.

UKSL (and hence UHL) allows a plurality of dialogs going on concurrently. For example, using the bulletin board transcript example; a problem solving resource can read the dialogical intercourse on the bulletin board and be reflective—consider the advice given by other problem solving resources and may choose to include these heuristics in an indexed secondary bin of heuristics that it files away for future reference if the need arises.

Problem solving resources will then be able to tabulate and choose to feed the generous problem solving resource that posted its UKSL (UHL) messages on the bulletin board.

Based on this quid pro quo—those that feed off the chain, such as the lay public, will have to pay or be removed from the networked community. That revenue will in part go to the producer of the UKSL (UHL) scripts.

Such a Problem Solving Community will lead to the creation of a directory listing of hierarchy of problem solving resources to seek help from, when unable to solve a problem. A Problem Solving Resource will step through the list of resources from which it will seek help with a query in UKSL (or UHL). The Directory itself is a master problem solving resource that classifies domains of knowledge and knows where to direct other problem solving resources to solutions to their problems.

The problem solving resources are in effect engaging in an electronic dialog.

The dialog between the first (psr1) and the second problem solving resource (psr2):

psr1: ask a question psr2: answer the question or psr2: ask a question of psr1 before answering.

To track the dialog each problem solving resource creates an input and output stack.

The question is preceded by ? while the answer is preceded by !. To ask a question before answering UHL uses the !? notation.

One way to do collaborative problem solving with unitary knowledge scripting language is with the following steps that implement solving by learning from others. In this simple example, the step of referring to a master resource for help is obviated by nominating a local choice:

i. Designate in the home problem solving resource a list of problem solving resources that are associated with centres of excellence with a particular category of problem (for example diseases in medicine), examples being endocrinology, cardiology and rheumatology, with their individual IP address and port, authorization codes, process ID and object ID.

2. When faced with a dearth of answers to a problem related to diabetes mellitus, a query string: ? diabetesMellitus will lead the home system to determine that the disease diabetesMellitus belongs to the category of endocrinological diseases and the same query will be sent to the institution problem solving resource on the top of the list in the Problem solving resource settings for that disease category. This will lead to a set of heuristics regarding diabetesMellitus to be downloaded to the request client home resource.

3. By populating the client belief system with these imported heuristics from the above trusted site, the client machine can then proceed to solve the problem. If the problem is still intractable, it then proceed to the next trusted site on the list.

The other way to do collaborative problem solving with unitary knowledge scripting language is with the following above steps that implement solving by asking for specific help from others: the client can ask the specific questions and obtain the answers from the server.

Some examples of dialog:

?—is the query and evaluation symbol, it will evaluate and return result based on the contextual modifiers of the query.

!—preceeds results of evaluation.

? by itself right after a response (preceeded by the ! symbol) will provoke the system to explain why it had responded that way. Hence to prompt the problem solving resource to output its response in unitary knowledge scripting language, the query has to be constrained by script modifiers, which lead to output of propositions that are pertinent to the solution which is sought. A query with just the theme will lead to an avalanche of propositions regarding that theme, e.g. ? diabetesMellitus How then to code for the knowledge that Australia has 50,000 general practitioners?

We use the special theme beliefSystem which covers common sense knowledge that is outside the confines of specific diseases or other medical entities.

2 jan 2000 beliefSystem ,australia ,generalPractitioner, , %50000 ,author%yko ,kbid%stillpointResearchCentre.

2 jan 2000 beliefSystem ,australia ,generalPractitioner , male ,%52% ,author%yko ,kbid%stillpointResearchCentre.

Based on the above proposition:

? ,australia ,generalPractitioner (the above can be translated into: Query in the context of Australia in the context of general practitioner.)

! beliefSystem ,australia ,generalPractitioner, ,%50000 , author%yko ,kbid%stillpointResearchCentre.

! beliefSystem ,australia ,generalPractitioner ,male ,%52% , author%yko ,kbid%stillpointResearchCentre.

However the query below will bring forth a different evaluation:

? australia ,generalPractitioner ,%

!50000

?

! beliefSystem australia ,generalPractitioner, ,%50000 , author%yko ,kbid%stillpointResearchCentre.

A Simultaneous Plurality of Dialog Utilising a Bulletin Board Transcript.

? 23 nov 2000 12:00:01 patient &ctx@heap@p@active , cough ,weight@loss ,kb%'drOon' ,thread%1

! 12 jun 1999 pneuonia &ctx@presentation ,consider [cough ,specificity%0.017 ,sensitivity%0.9 ] , author%drHowzat ,kb%CanberraMedicalResearchInstitute , thread%1.

! 24 may 1999 systemicLupusErythematosus &ctx@presentation ,consider [cough ,specificity%0.07 ,sensitivity%0.8 ] ,author%drBest ,kb%MoonInstitute , thread%1.

! 4 apr 2000 malaria &ctx@presentation ,consider [cough , specificity%0.001 ,sensitivity%0.1 ] ,author%DrBush , kb%StillpointMedicalInstitute ,thread%1.

Commentary:

Dr Oon poses a question of a patient with an active heap context of cough and weight loss. Three problem solving resources with heuristics written by Drs Howzat, Best and Bush were returned with the thread and problem solving resource identifications. The problem solving resource of Dr Oon can periodically scan the bulletin transcript for any response to the dialog thread that he started and copy the heuristics or answer for his own problem solving strategy.

The query

20 Jun. 2000 self ,bmi ,eval will lead to the query:

self ,bmi

The result of this query is nil as there is no information recorded about the bmi.

The knowledge object next step is to see if there is a formula in its belief system whereby bmi can be calculated. The next script being:

20 jun 2000 self bmi formula ,script

If the result is nil as there is no formula on bmi.

It will approach directory services with script:

directory ,bmi ,eval

This will return remote problem solving resource site recommendation, such as:

www.instituteOfWeightResearch.com/kb

The local problem solving resource will then send the script below to the recommended site, which will then return the knowledge script on how bmi can be calculated:

The script below 20 jun 2000 bmi ,formula ,script will produce . . .

1 jan 1999 bmi formula [ A := (self weight)/((self ,height) * (self height)).

^A

] ,author%DrBrown ,kbsite%instituteWeightResearch

The local problem solving resource will then attempt to compute the bmi by first obtaining the weight then dividing by the square of the height.

Another Example

Dialog with problem solving resources about the normal white cell count.

The steps are generally:

Ask the resident problem solving resource—if it does not know the answer, it will search through the list of brokers suggested and interrogate each broker one by one in UKSL (or in this case, UHL).

Finding out the normal range of wcc is posed by the UHL query:

? whiteCellCount ,normal ,range.

The steps are:

1) Ask itself, if it does not know

2) Ask another supervisory problem solving resource the same question: ? whiteCellCount ,normal ,range.

3) the response may be:

whiteCellCount ,normal ,range%5000__12000/ml ,broker%monashUniversityBrain

Another example involving evaluation

? whiteCellCount ,%14000/ul.

! whiteCellCount*h

Where the * sign means abnormal and *h means abnormal high.

The following is another example of an evaluation that will return heuristics rather than a specific answer. This example shows that there are only two known facts on cough:

? cough ,heuristics

! pneumonia &ctx@presentation ,consider [cough ,specificity%0.07 ,sensitivity%0.8 ] ,author%ykoon.

malaria &ctx@presentation ,consider [cough ,specificity%0.001 ,sensitivity%0.1 ] ,author%ykoon.

The paradigm used in this invention is the option that the problem solving resource does not solve the problem for you, but returns to you a set of heuristics for you to solve your problem. Instead of giving you the fish, it teaches you how to fish.

"Everytime you give the problem solving resource the answer, you are disempowering it"

Therefore the tack is to empower it. But periodically, (for example every three to six months), client problem solving resources should have the option of having their knowledge "bled" or purged—so that only the latest heuristics are plugged in. Alternatively, a date bar could be set so that dated heuristics are deprecated and not referenced if more current heuristics are available.

That way we have a problem solving resource with incremental increase in intelligence and problem solving power. In a collaborative and trusting environment, the network's intelligence simply escalates.

Glossary unitary language—a language with a single syntactical and semantic construct capable of use for purposes including communication, knowledge representation, heuristics, problem solving and client records.

unitary knowledge scripting language (UKSL)—a representational system comprising means for problem coding, knowledge scripting, heuristics representation, it is context sensitive and is suitable for bi-directional communication among many problem solving resources, both human and machines. UKSL may be used for any suitable knowledge based service. For example, in health (or medicine), UKSL would be a unitary health language or UHL (as below).

unitary health language—a representational system in health comprising means for disease coding, knowledge scripting, heuristics representation, it is context sensitive and is suitable for bi-directional communication among many problem solving resources, both human and machines.

problem solving resources—comprises both human and machine problem solvers.

ctx—means context or circumstances or setting of an event or situation. Context modifiers allow the weaving of the words of the unitary knowledge scripting language into a language.

Docle—name given to system and method of classifying terms (such as medical terms) in a linnean hierarchy.

docleScript—a name that may evolve one day to describe unitary knowledge scripting language heap stands for accrual context data in a patient e.g. list of active problems, medications.

links=test results

Master Directory Problem Solving Resource—a resource that co-ordinates problem solving within a community of problem solving resources.

plum stands for presentation, links, unity and management.

presentation=symptoms+signs.

proposition—a scheme offered for consideration and a statement of logic. In UKSL, a proposition has at least the properties of a theme and modifiers. The concept of a propositions is defined mathematically in Extended Backus Naur Formalism.

unity=diagnoses management=drugs+procedures

& code shear operator is context modifier operator

% sign means "value"

UHL—unitary health language

UKSL—unitary knowledge scripting language

Unitary knowledge scripting language framework can also be used for non medical problem domains. The language structure is useful for communication among a plurality of problem solving resources across a communications network such as the internet and is easier for direct human apprehension compared to a SGML tagged language like HTML or XML or derivatives.

For example if we wish to communicate to a problem solving resource about holidays in bali:

holidays ,bali

Which translates into: holidays in the context of bali , a modifier is like a gentle glancing blow to orient the theme.

While the following statement would be a UHL type query over the internet about a search for a room under US$10/night in the island of bali.

? hotel ,bali (,room ,price%<US$10/night)

hotel in the context of: bali with the subplot of room in the context of: price<$10/night.

For meaning of the, operator, we can use the phrase 'in this case of' or 'in the context of'.

Instead of CGI (common gateway interface), the following UHL command

? driver@software ,brand%epson ,model%h127 ,download will activate the downloading of the Epson h127 printer driver.

Explanation: driver already means a car driver, therefore to avoid the clash in this single namespace world of UKSL, the new word driver@software is created to avoid the clash in meaning.

A UKSL type script is useful for looking up all second hand Hondas on sale in Melbourne.

? car ,buy ,brand%honda ,price%<$5000 ,locality % Melbourne

The above query is that of the KB wanting to buy a car of the Honda type in the Melbourne area for less than $5000

The responding problem solving resource might respond with the message

! car ,sell ,brand%Honda ,price %$4500 , locality%Melbourne ,phone%97638935 , dealer%MaxCarDiscount , url%www.maxcardiscount.com.au.

The Unitary problem solving resource (UPSR) is sufficiently intelligent to know that buy/sell are complementary activities like send/receive information The following is a request to borrow a book:

? book ,borrow (,title%'living letters' (,author(,taylor ,Kenneth)).

A local library UPSR with a copy in stock will respond:

! book (,lend(,title%'living letters' (,author%'kenneth taylor'))),library%'waverley'.

Brokerage for internet requests can be facilitated by attaching UKSL scripts to internet documents:

For example an internet document on unitary health language version 1 known as uhl1 computer software will have the following script attached:

rfi ,medical ,computing ,software ,uhl1 ,author%'yk oon' ,url%www.docle.com.au

A problem solving resource of the web crawler type then extricates all these UKSL scripts attached to web documents and will build up a massive index of knowledge encased in UKSL propositions with universal resource locator will solve the problem of contextual problem in web searching. Web searches will be issued by client problem solving resources attached to their web browser as a plug-in or integrated with the browser itself.

The query below is a request for information(rfi), issued from a web browser that is equipped with a problem solving resource that uses the same UHL language in its query.

? rfi medical computing ,software ,uhl1 will return the website www.docle.com.au

APPENDIX of contextual modifiers

,4wd
,accident
,accident@non
,accident@traffic
,accident@traffic@non
,air
,aircraft
,aircraft@carrier
,aircraft@comb-at
,aircraft@comb-at@non
,aircraft@fixedWing
,aircraft@light
,aircraft@light@ultra
,aircraft@liner
,alighting
,altitude
,animal
,appl-iances
,appl-iances@elec-tric
,arch-ery
,auto-motive@heavy
,auto-motive@light
,auto-motive@light@ultra
,auto-motive@medi-um
,avalanche
,badminton
,ball-oon@spor-ts
,baseBall
,basketBall
,bicycle
,bicycle@motor
,boarding
,boat
,boat@motor
,boat@motor@non
,bobSled
,bowl-ing
,bowl-s@petanque
,boxi-ng
,bridge
,building
,bull-ying
,bullDozer
,bus
,bus@mini
,bystander
,camp-ing
,cano-eing
,canyoning
,car
,caravan
,coll-ision
,coll-ision@headOn
,coll-ision@non
,coll-ision@rear@rece-iver
,coll-ision@rear@server
,coll-ision@side@rece-iver
,coll-ision@side@server
,comm-ercial
,communication@equi-pment
,cool-ing
,craft@infl-atable
,craftimari-time
,crew
,cricket
,crim-e
,crim-e@victim
,crocodile
,crus-h
,cycl-ing
,deca-thlon
,defe-cating
,derailment
,desert
,disaster@natural
,disc-us
,divi-ng
,divi-ng@scuba
,divi-ng@sky
,doItYourself
,driv-er
,drowning@subm-ersion
,drug@use
,eart-hquake
,eating
,ethanol@use
,ethanol@use<<limit
,ethanol@use>>limit
,exercise@aero-bics
,expl-osion ,fact-ory
,fall
,fallingObject
,farm
,fencing@spor-ts
,ferr-y
,fireEngine
,fish
,fish-ing
,footBall
,forkLift
,freeway
,furniture
,gard-en
,glid-ing
,goKart
,golf
,gunshot
,gymn-asium
,gymn-astics
,hammer@athletics
,handBall
,hangGliding
,heat-ing
,heli-copter
,helm-et
,helm-et@non
,hept-athlon
,heuristics
,hockey
,hockey@ice
,holi-days
,holi-days@local
,holi-days@overSeas
,home
,horse@racing
,horse@racing@harness
,horse@riding
,hoverCraft
,hurdles@athletics
,inte-rsection
,inte-rsection@inte-rchange
,inte-rsection@t
,javelin
,jewe-lry
,jogging
,judo
,jump@high
,jump@long
,jump@trip-le
,kara-te
,kayaking
,kb
,kitchen
,knife
,kungFu
,land
,leis-ure
,lice-nce
,lice-nce@l
,lice-nce@non
,lice-nce@p
,ligh-tning
,luge
,motorBike
,motorBike@sideCar
,motorHome
,moun-taineering
,netBall
,nucl-ear@stat-ion
,occu-pant
,office
,optimistic
,para-chuting
,paraGliding
,pass-enger
,pass-enger@front
,pass-enger@rear
,pass-enger@rear@driv-er
,pass-enger@rear@middle
,pass-enger@rear@pass-enger
,peace
,pede-strian
,pent-athlon
,pessimistic
,plant
,plum-bing
,pole
,pole@vault
,polo ,polo@water
,powe-red
,powe-red@non
,prot-agonist
,racquetball
,realistic
,religion@practice
,rest
,roll-er@blad-e
,roll-er@skate
,roof
,roun-dabout
,rowi-ng@sculling
,rugby
,running
,running@dist-ance
,running@spri-nting
,rural
,sail-ing
,sailBoarding
,school
,school@excu-rsion
,school@from
,school@to
,sea
,sea@deep
,seatBelt
,seatBelt@non
,self@infl-icted
,selfPropelledGun
,semiTrailer
,sexualIntercourse
,ship
,ship@comb-at
,shoo-ting@spor-ts
,shop
,shot@put
,skat-ing
,skiing@snow
,skiing@water
,snowMobile
,soccer
,spaceCraft
,spor-ts
,spor-ts@aerial ,spor-ts@athletics
,spor-ts@comb-at
,spor-ts@equestrian
,spor-ts@fitness
,spor-ts@leis-ure
,spor-ts@water
,spor-ts@wint-er
,squash
,stai-rs
,submarine
,sun
,swim-ming
,taekwando
,tank
,tennis
,tennis@table
,thread
,trac-k@field
,trai-ler
,train
,tram
,tree
,tric-ycle
,truck
,truck@cran-e
,urban
,urin-ating
,utility@auto-motive
,van@auto-motive
,vehicle@auto-motive
,vehicle@auto-motive@non
,vehicle@farm
,vehicle@grad-er
vehicle@scra-per
,vehicle@solar
,victim
,volcano
,volleyBall
,walk-ing
,walk-ing@athletics
,war
,water
,water@salt
,water@salt@non
,weightLifting ,whee-l@trac-tor
,work
,work@excu-rsion
,work@from
,work@to
,wres-tling

BRIEF DESCRIPTION OF THE DRAWINGS

The invention will now be further explained and illustrated by reference to the accompanying drawings in which.

DESCRIPTION OF PREFERRED EMBODIMENT

The following description is intended to describe the embodiment whereby each of the elements of the invention are used in combined form, namely, Unitary Knowledge Scripting Language, Split Consultation System and Problem Solving Community. The figures merely depict the user interface of the pre-consultation step of the split consultation system.

Figure 1:
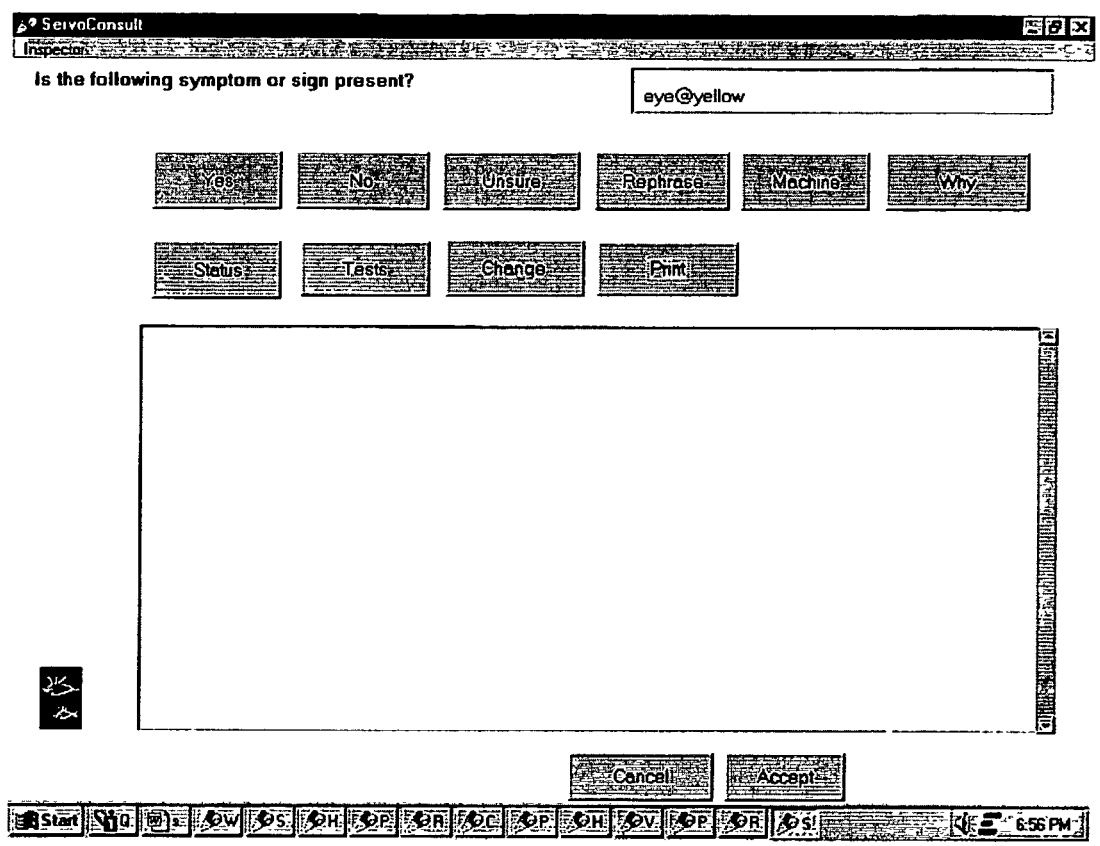
FIG. 1 depicts the servo consultation user interface.

FIG. 1 depicts the servo consultation user interface. At the top is the modal question which can only be dismissed by a 1) Yes 2) No or 3) Unsure response. A Yes response will attract a 1 value to the symptom/sign, while an Unsure response attract a 0 and a No will attract a value of −1.

The modal question is whether the patient has eye@yellow. This program has been seeded with a single symptom of abdomen@pain from a pick list. The internal state of the machine is hold as fact only one presentation item, 'abdomen@pain'. After a global evaluation utilising the steps previously described, the best candidate question is posed.

Figure 2:
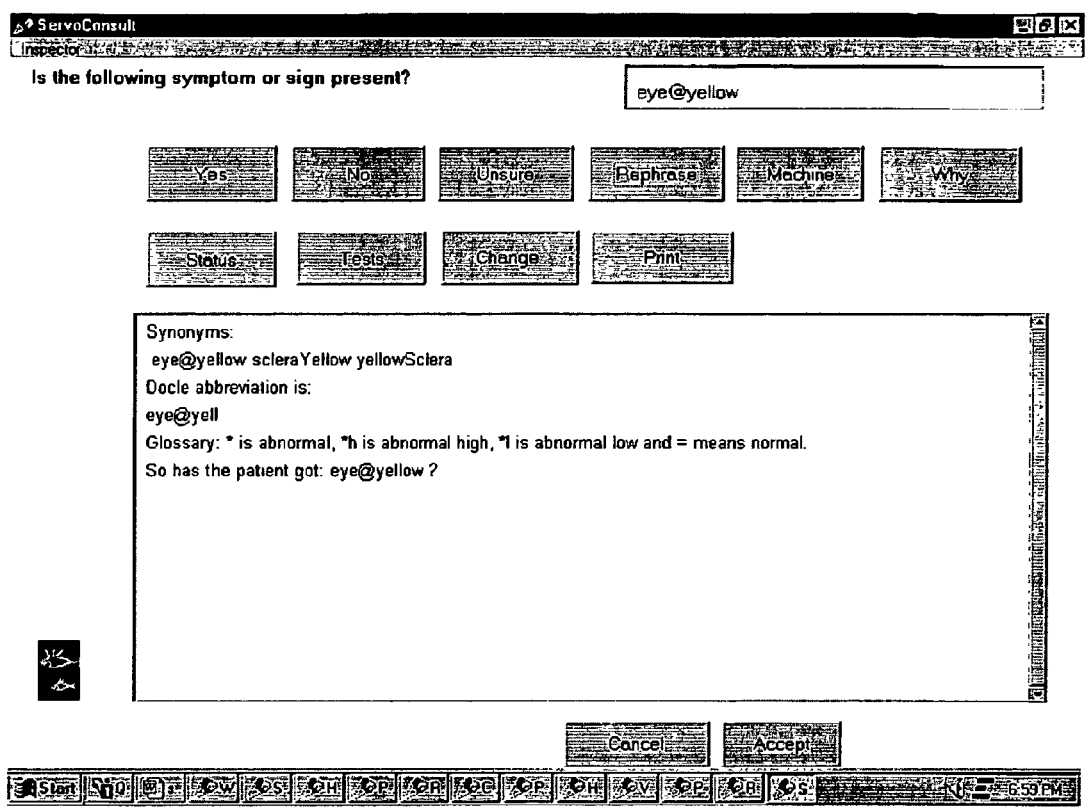
FIG. 2 depicts the machine's response to the activation of the rephrase function.

FIG. 2 depicts the machine's response to the activation of the rephrase function. It outputs into the Transcript window the synonyms of yellow eye or yellow sclera, it also gives the abbreviation code of the item which is eye@yell and explains the syntax of explaining normal and abnormal codes.

Figure 3:
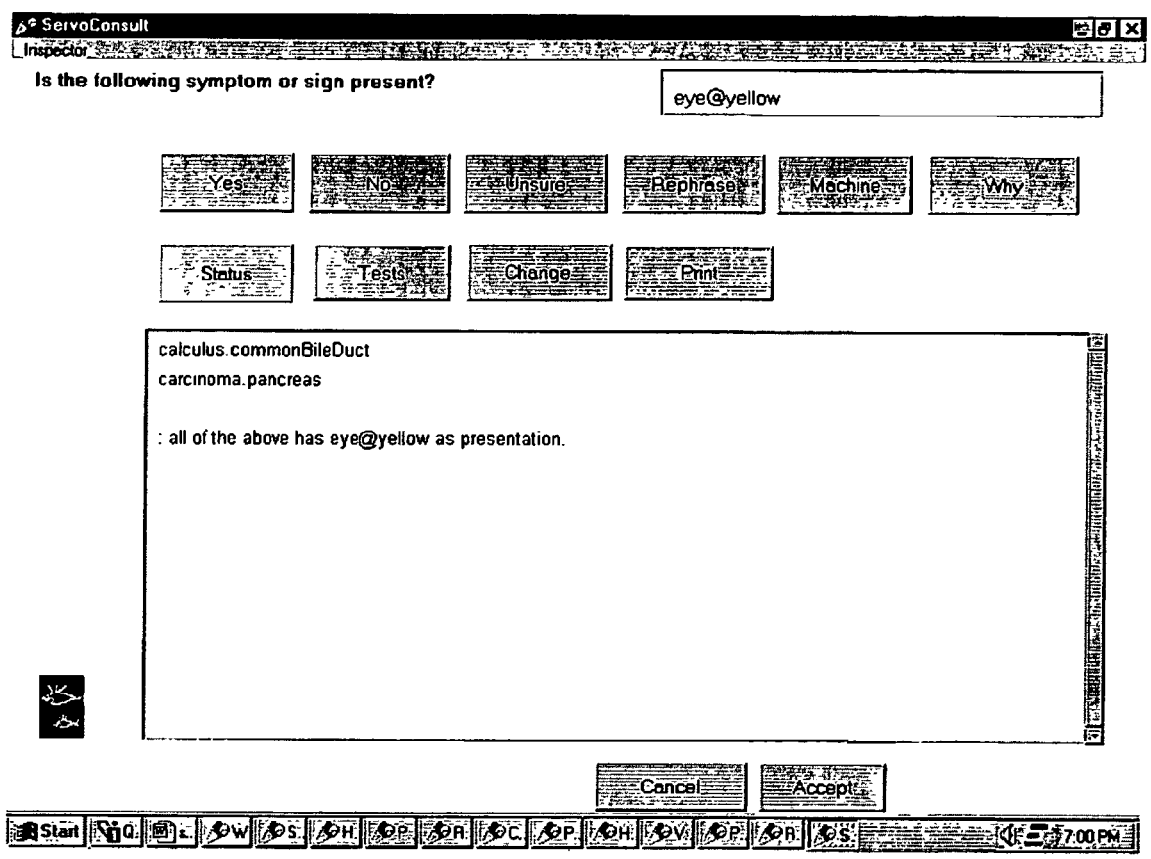
FIG. 3 depicts the machine response to the question Why?

FIG. 3 depicts the machine response to the question Why? Drawing on its internal belief system, the machine wanted to rule in/support or rule out/undermine the diagnoses of calculus.commonBileDuct and carcinoma.pancreas. Activating on Why? will get the rationale for asking the candidate further questions through the process of backtracking.

Figure 4:
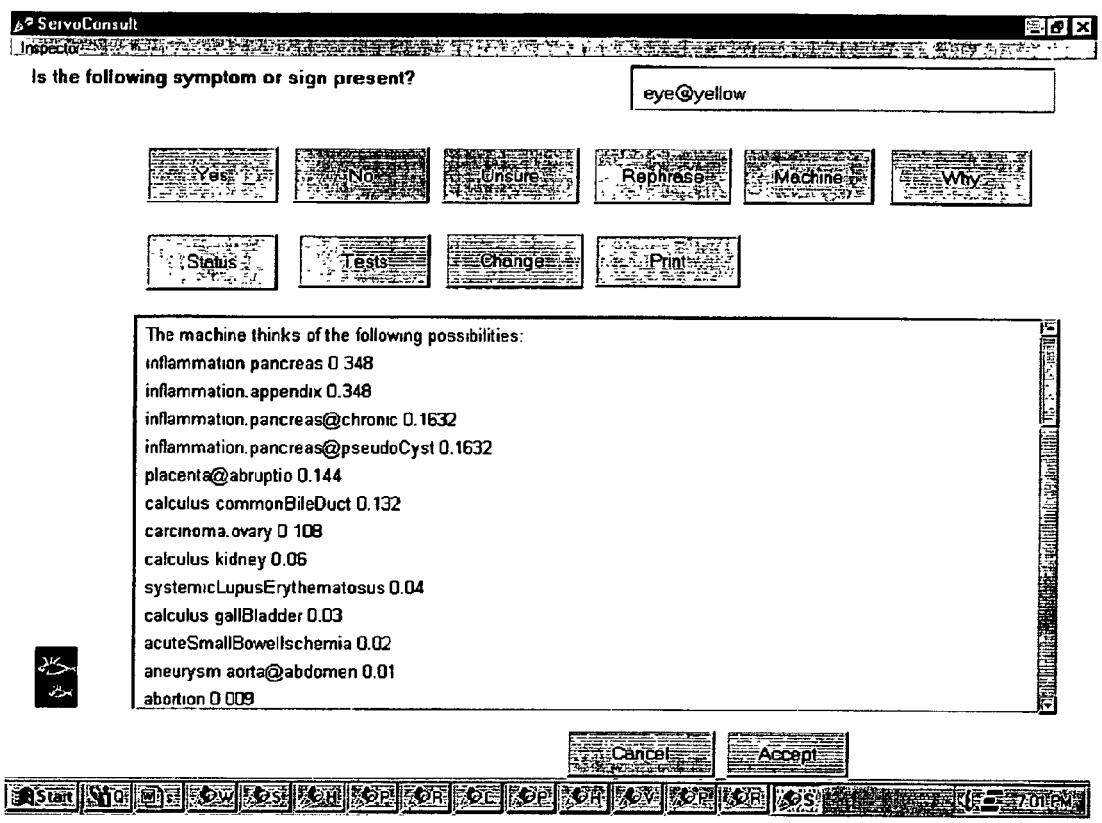
FIG. 4 depicts that the machine thinks of various possibilities in its differential diagnosis in the Transcript window when the machine button is activated.

FIG. 4 depicts the machine thinks of the following possibilities in its differential diagnosis in the Transcript window when the machine button is activated:
   inflammation.pancreas 0.348
   inflammation.appendix 0.348
   inflammation.pancreas@chronic 0.1632
   inflammation.pancreas@pseudoCyst 0.1632
   placenta@abruptio 0.144
   calculus.commonBileDuct 0.132
   carcinoma.ovary 0.108
   calculus.kidney 0.06
   systemicLupusErythematosus 0.04
   calculus.gallBladder 0.03
   acuteSmallBowellschemia 0.02
   aneurysm.aorta@abdomen 0.01
   abortion 0.009

Figure 5:
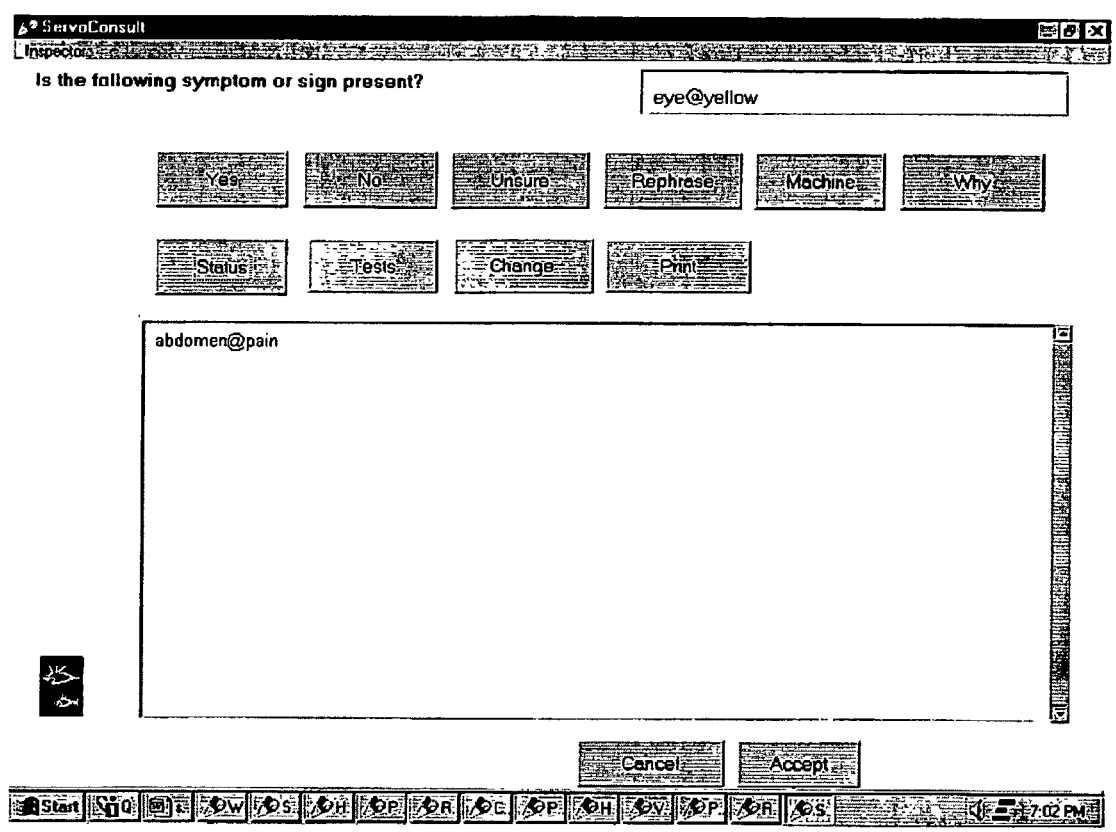
FIG. 5 depicts the machine internal status when the Status function is activated.

FIG. 5 depicts the machine's internal status when the Status function is activated, in this instance the solitary information it holds about the patient is the fact that he has abdomen@pain.

Figure 6:
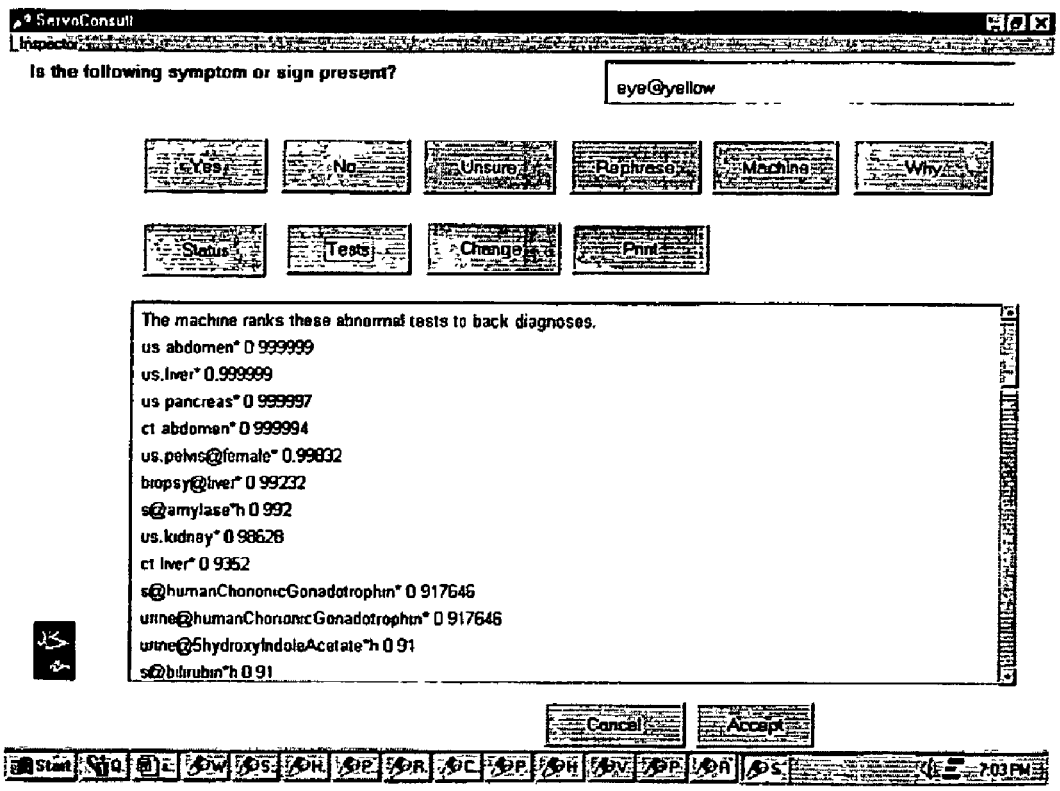
FIG. 6 depicts the response in the Transcript when the Tests function is activated.

FIG. 6 depicts the response in the Transcript when the Tests function is activated.

Inferring from the list of differential diagnosis, the servo consultation system retrieves the tests that are needed to support the diagnoses. In this instance the machine is suggests an ultrasound of the upper abdominal region.

The machine ranks these abnormal tests to back diagnoses:
   us.abdomen* 0.999999
   us.liver* 0.999999
   us.pancreas* 0.999997
   ct.abdomen* 0.999994
   us.pelvis@female* 0.99832
   biopsy@liver* 0.99232
   s@amylase*h 0.992
   us.kidney* 0.98628
   ct.liver* 0.9352
   s@humanChorionicGonadotrophin* 0.917646
   urine@humanChorionicGonadotrophin* 0.917646
   urine@5hydroxyIndoleAcetate*h 0.91
   s@bilirubin*h 0.91

The machine ranks these abnormal tests to back diagnoses:
   us.abdomen* 0.999999
   us.liver* 0.999999
   us.pancreas* 0.999997
   ct.abdomen* 0.999994
   us.pelvis@female* 0.99832
   biopsy@liver* 0.99232
   s@amylase*h 0.992
   us.kidney* 0.98628
   ct.liver* 0.9352
   s@humanChorionicGonadotrophin* 0.917646
   urine@humanChorionicGonadotrophin* 0.917646
   urine@5hydroxyIndoleAcetate*h 0.91
   s@bilirubin*h 0.91

Figure 7:
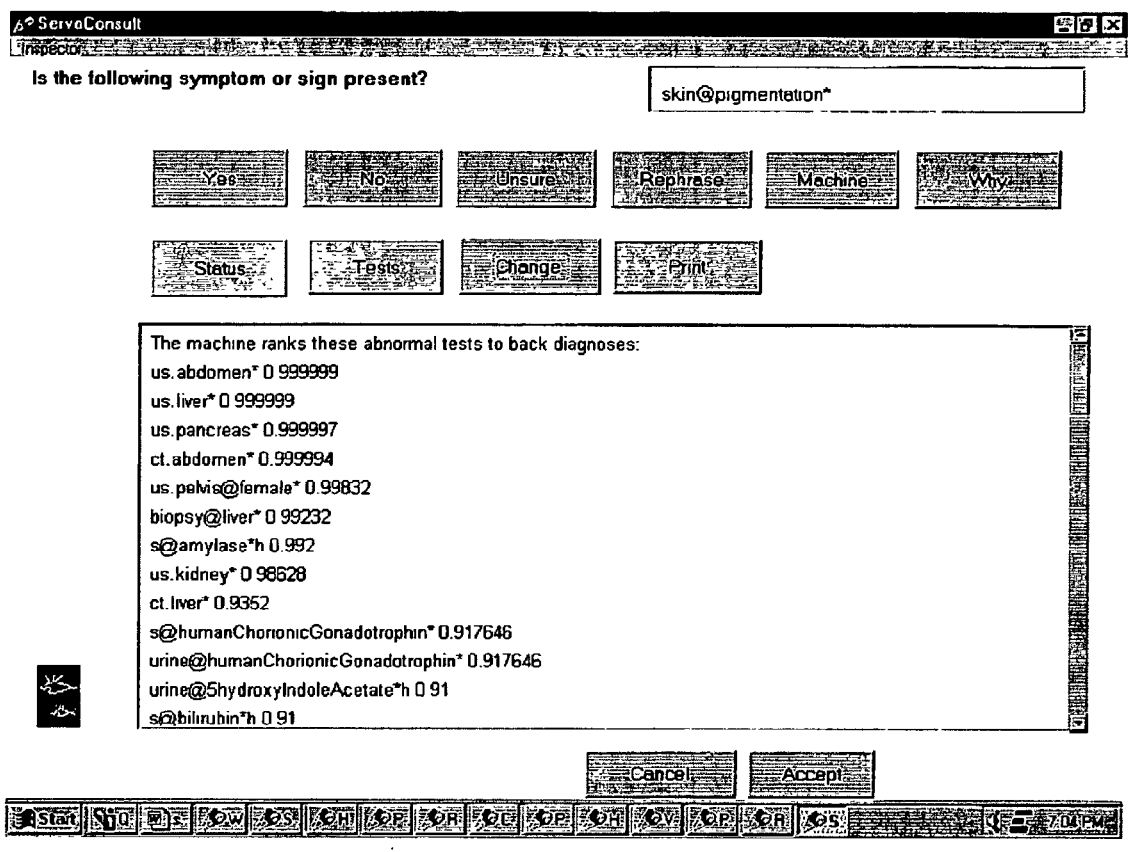
FIG. 7 depicts the response to the activation of the Change function.
Figure 8:
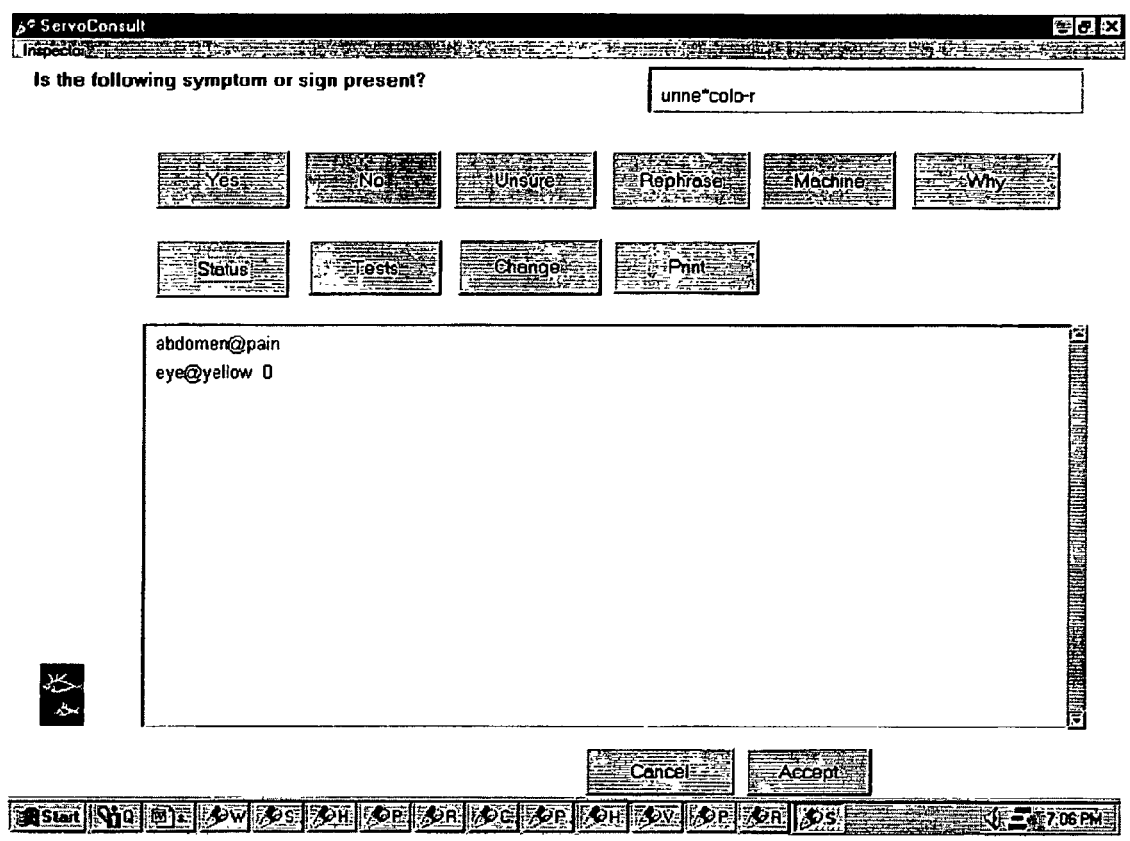
FIG. 8 depicts the status of the machine after activation of the Unsure button.

FIG. 7 depicts the machine's response to activation of the Change function. The system jumps to a candidate question held in its special reserved pool of systems review questions. This function is similar to the healthcare professional doing a systems review at the end of history taking to systematically cover all areas of the history FIG. 8 depicts the status of the machine after activation of the Unsure button. The next candidate question posed is about any abnormal urine color: urine@colo-r* and the status button reveals the internal state of the machine which shows a zero rating next to eye@yellow, a nil rating next to abdomen@pain implies a 1 rating which implies certainty. A −1 rating implies the certainty of absence of a symptom or sign.

Figure 9:
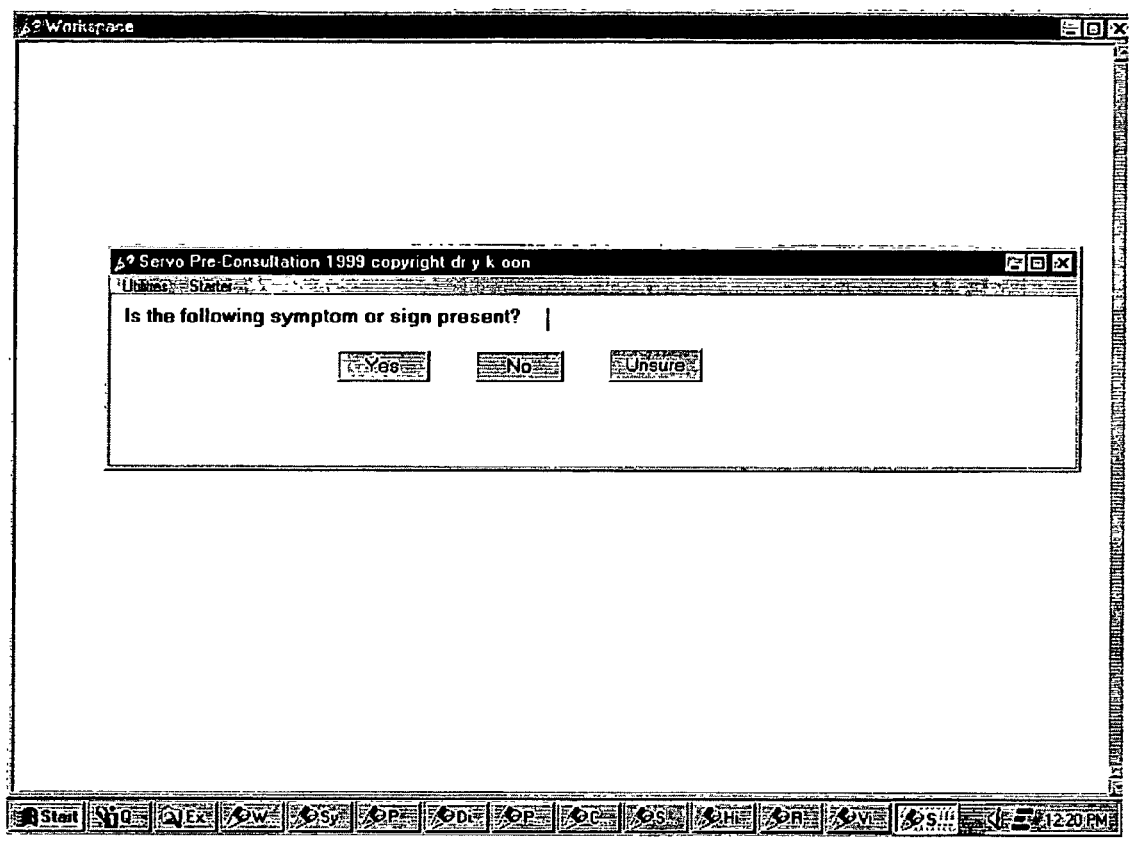
FIG. 9 depicts the basic 1) yes 2) no 3) unsure interface of one embodiment of the preconsultation history event collector.

FIG. 9 depicts the basic 1) yes 2) no 3) unsure interface of one embodiment of the preconsultation history event collector.

Figure 10:
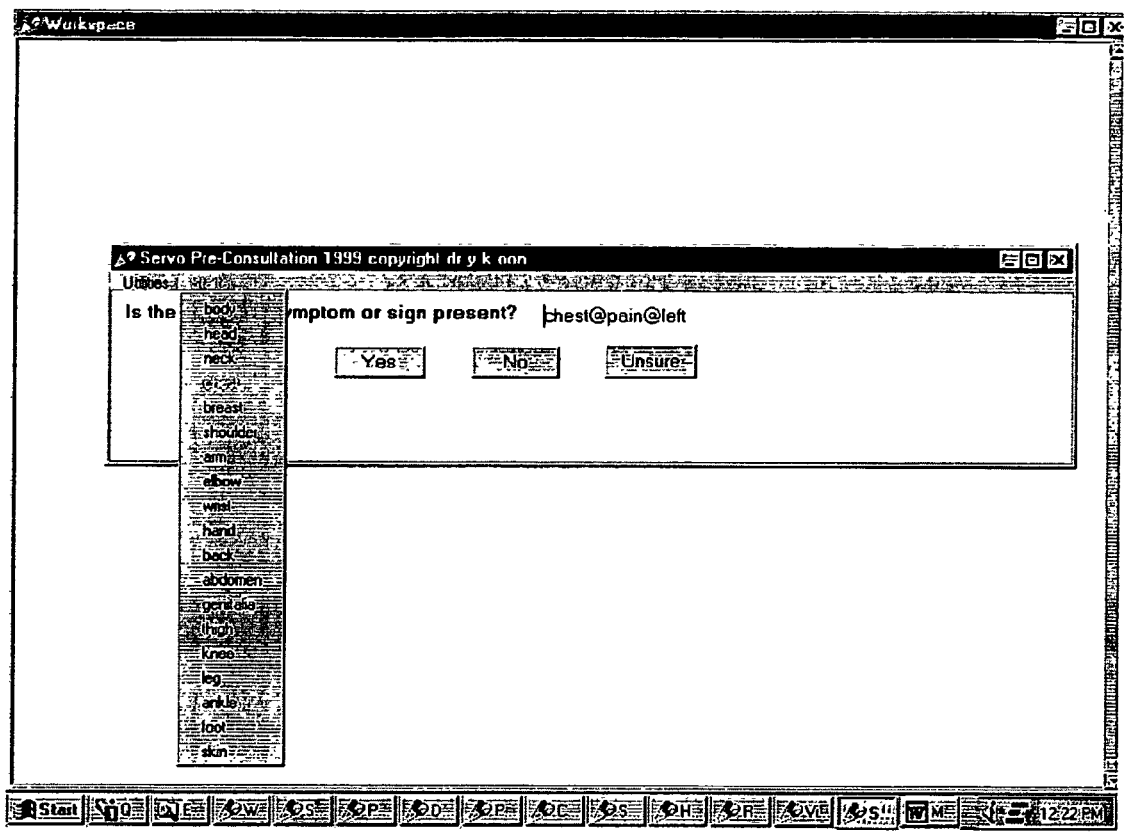
FIG. 10 depicts one embodiment of the preconsultation history event collector where the consultation is initiated by nominating the anatomical region affected.

FIG. 10 depicts one embodiment of the preconsultation history event collector where the consultation is initiated by nominating the anatomical region affected.

Figure 11:
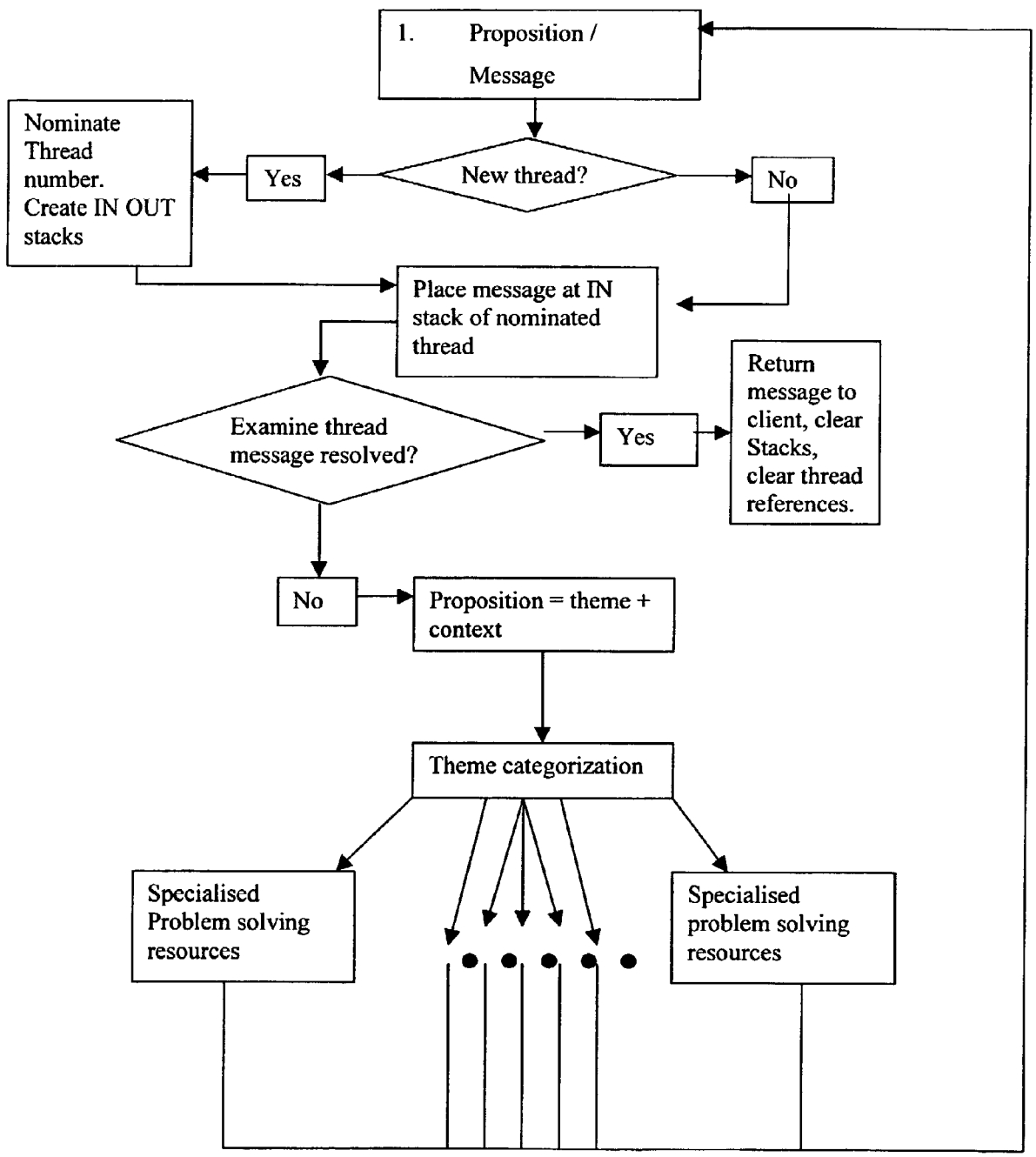
FIG. 11 depicts one embodiment of the master directory services.

FIG. 11 depicts one embodiment of the master directory services. It shows how it keeps track of each dialogical session and how the query/messages are farmed out to outside problem solving resources to solve, their responses are marshalled and when the original query is resolved, the response is sent back to client and all dialog thread references cleared.

Figure 12:
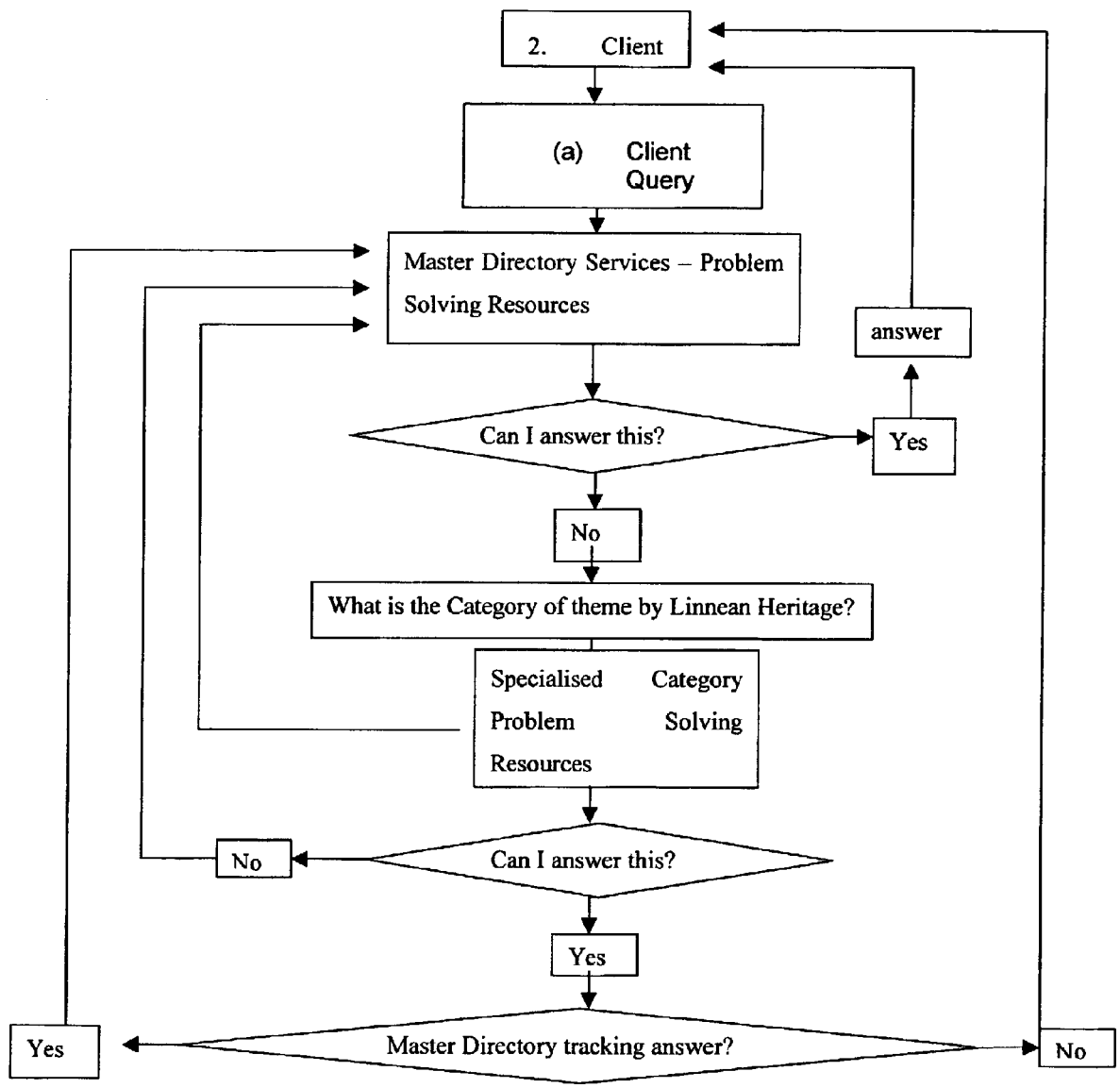
FIG. 12 depicts one embodiment of a problem solving resource community using the services of a master directory problem solving resource.

FIG. 12 depicts one embodiment of a problem solving resource community using the services of a master directory problem solving resource. In this embodiment a query from a client resource is relayed by master directory to a specialised problem solving resource.

The community of problem solving resources claimed in this invention creates a world wide web of problem solving resources that is significantly different from the prior art, in terms of automated machine problem solving. The prior art of the current world wide web of internet resources is based on web pages and hypertext markup language (HTML). Web pages have content that are rich in both text and graphics; the combination of HTML and the web browser allows humans to navigate and view web pages by hyperlinks. The claimed invention comprises a proposition based language construct that forms the basis of the messaging system among a plurality of problem solving resources.

Overview of Architecture.

Unitary health language is structured as date and time stamped propositions, this lends the ability to do commutative and associative aggregations of the propositions. That way it is possible to build an incremental medical brain at one site or split into a plurality of sites. This problem is solved by having one or more master directory problem solving resource(s) (mdpsr) as a crucial point of reference in the electronic community.

Any client problem solving resource can talk to other resources or simply connect to the master directory problem solving resource which will 1) route the message to a problem solving resource that it thinks best fit the nature of the problematic query, washes hands completely, conveying to the problem solving resource also identity of original source of the request so that answer goes back there 2) attempt to solve the query by interrogating itself and solving it 3) interrogate other resources and repackaging the response in UHL back to the original client 4) return to the client the list of one or more problem solving resources it can consult as master directory was unable or unwilling to consult those resources due to access difficulties 5) unable to solve problem, but able return a set of relevant heuristics it has pertinent to client query 6) Say sorry to client that it is totally unable to help, keep a record of the query that it cannot resolve so that the problem can be revisited by man or machine later.

Using this architecture it is possible to hollow out the heuristics base completely at the client problem solving resource, this will of course solve the problem of updating the knowledge base at the user client level. All heuristics will be held at master directory services and specialised problem solving resources.

A Practical Example:

The scenario is that of the busy Dr Oon clinic. He has a patient Joe Blow who has a cough and also noticed some facial weakness on the left side. He has a 11 AM appointment at the clinic, although he is aware that Dr Oon is astute, from experience he has benefited from interacting with a pre-consultation servo history event collector which is more methodical and educates him as to possible diagnoses. He has the following accrual context in his medical history:

1 jul 2000 &ctx@heap@drug@active ,consider [ enalapril . aspirin. allopurinol ].

1 jul 2000 &ctx@heap@u@active ,consider [ hypertension . hyper@uricAcid ].

1 jul 2000 &ctx@heap@drug@allergy ,consider [ penicillin. sulf-onamide ].

1 jul 2000 &ctx@heap@social ,consider [ policeman. tennis ].

1 jul 2000 &ctx@heap@family ,consider [ carcinoma.prostate ].

He knows that at the clinic where Dr Oon works, patients can seek help with servo pre-consulation module to elicit a proper medical history. He logs into the internet from home and was eventually connected to Dr Oon's website which featured a plug-in application which is the servo pre-consultation module which performs some security checks such as username and password. Authentication will cause the accrual context component of his medical record to be transferred to the servo pre-consultation module. By answering a series questions with: yes, no and unsure, the following history in UHL is collected and transferred back to the clinic computer:

|#presentation |

26 nov 2000 cough ,duration%2week |

26 nov 2000 face@weakness ,%1day |

26 nov 2000 face@swelling ,%1day |

26 nov 2000 face@rash ,%1day |

|#unity |

26 nov 2000 &ctx@imho ,consider [ bell@palsy . eczema . herpesZoster ],rank%0.7 .| where the contextual organizer &ctx@imho stands for context-in my humble opinion, this is widely used when machines give their opinion.

When Joe sees Dr Oon at 11 AM, the output of the pre-consulation servo event collector module is imported into a knowledge spreadsheet where the machine evaluation about the problems of Joe is encapsulated by the heuristics in the planning section, all ranked according to blessing levels.

|#planning |

1 apr 1999 enalapril &ctx@adverse@reaction ,consider [ cough . dizziness . head pain . nausea . rash ] ,rank%.92.

2 jun 2000 bell@palsy ,consider [ face @weakness ],rank%.91.

2 jun 2000 herpesZoster&bell@palsy ,consider [face@weakness. face@rash ] ,rank%.90.

2 jun 2000 herpesZoster&bell@palsy ,consider [face@weakness. face@rash ] ,rank %.90.

2 jun 2000 eczema ,consider [rash. face@rash . skin @itch ] ,rank%.80.

Dr Oon dialogs and examines the patient in the light of the history collected and looks at the heuristics pertinent to the case. He makes the clinical diagnosis of herpes zoster based on the appearance of the rash. He concurs with the machine diagnosis of bell@palsy , a 7th cranial nerve or facial nerve lesion of the Bells Palsy type attributed to the herpes zoster infection of the seventh cranial nerve. He interrogates his spreadsheet about the best treatment for herpes zoster with response: ! 12 apr 2000 herpesZoster &ctx@management , consider [ valaciclovir ,dose%1000mg/24hi ,route%oral , duration%1week ,rank%.8].

He decides the cough is not much of a problem and chose to defer withdrawing the enalapril.

He interrogates his spreadsheet about the best treatment for bells palsy:

!2 apr 2000 bell@palsy &ctx@management ,consider [ prednisolone (,dose%50mg/24hi ,half/3di) ,route%oral , duration%9day ,rank%.8 ].

"dosage is halved every 3 day interval"

Dr Oon is confused about giving prednisolone and valaciclor concurrently as he is concerned that the prednisolone may feed the viral infection.

Therefore his query o his local problem solving resource:

? herpesZoster&bell@palsy &ctx@management

! nil was of no help, he therefore channeled the query to external help by sending the same query to the master directory of problem solving resources held at the master directory website. The problem solving resources are deemed to involve in an electronic conversation.

The conversation between the first (psr1) and the second problem solving resource (psr2):

psr1: ask a question psr2: answer the question or psr2: ask a question of psr1 before answering.

To track the dialog each problem solving resource creates an input and output stack for each thread of dialog. Any incoming messages belonging to the same psrid (knowledge broker identity) are pushed into the IN stack, while all outgoing messages are pushed into the OUT stack. That way it is possible to map the response messages to the query messages.

The question is preceded by ? while the answer is preceded by !. To ask a question before answering UHL uses the !? notation.

At the master directory level, the query was resolved to be an infectious nature from the linnean hierarchy that herpes zoster is classified into. Its preferred problem solving resource for infectious diseases is the hypothetical Royal Alfredo Hospital Infectious disease in Melbourne. This resource returns the heuristic which encapsulates the solution to the problem.

1 apr 2000 herpesZoster&bell@palsy &ctx@management , consider ,all

[ prednisolone (,dose%50mg/24hi ,half/3di) ,route%oral , duration%9day ,rank%.8.

valaciclovir ,dose%1000mg/24hi ,route%oral , duration%1week ,rank%.8 ],rank%.8 , author%profRon_Mcdonald ,kbid%royalAfredoHospital.

When this message was routed back to Dr Oon's machine he understood that giving the two drugs are recommended by a top authority at the Royal Alfredo Hospital.

—end system of operation—

The word 'comprising' and forms of the word 'comprising' as used in this description and claims do not limit the invention claimed to exclude any variants or additions.

While it has been convenient to describe the invention herein in relation to particularly preferred embodiments, it is to be appreciated that other constructions and arrangements are also considered as falling within the scope of the invention. Various modifications, alterations, variations and or additions to the construction and arrangements described herein are also considered as falling within the ambit and scope of the present invention.

The invention claimed is:

1. A method of coding data for use in data representation and problem solving in knowledge-based services, the method comprising the steps of:

receiving context-oriented items of information;

marshalling said information in a computer system;

providing an organised and classified vocabulary of terms which derive from a natural human language to facilitate ease of comprehension by humans, the classification of said vocabulary of terms being based on a belief system predicated on a hierarchical classification system;

rendering said information in the form of a string of expressions expressed in a unitary machine parsable scripting language using said vocabulary of terms, the language based upon the use of expressions containing said terms able to represent items of information;

inserting in said string of expressions contextual code components including contextual modifier expressions and contextual organiser expressions, said contextual code components able to provide a context of items of information, the contextual code components comprising terms from said organised and classified vocabulary of terms, each said contextual code component able to embody both an intrinsic meaning and a place value significance, the place value significance augmenting the meaning of the resultant expression depending on the positional relationship of the contextual modifier expression to a contextual organiser expression, the use of said contextual code components based on a structure of propositions, said propositions coding to express contexts selected from the group of themes, plots and subplots, each subplot being adapted to be able to contain successive further subplots, thus enabling increased expressivity using a limited number of terms in said vocabulary; and outputting said information as coded data for interrogation, further processing or analysis.

2. A method according to claim 1, wherein said contextual modifier expressions are separable from the remaining term or terms of an expression by use of a shear operator, such the contextual code components can stand alone as independent codes, enabling the refactoring of terms from said vocabulary as contextual code components.

3. A method according to claim 1, wherein said contextual code components are configured to effect information tunnelling and thereby increase expressivity with minimal compromise of computer precision.

4. A method according to claim 1, wherein said contextual code components include accrual context components to enable collection and utilisation of a pool of background data.

5. A method according to claim 1, wherein the step of rendering and/or the step of inserting includes the provision of a blessing level for grading available options for said expressions.

6. A method according to claim 1, wherein said unitary machine parsable scripting language comprising a uniform syntactical and semantic construct to facilitate transportability across a variety of applications.

7. A method according to claim 1, applied to an application selected from the group of information collection, problem solving, heuristics, man-machine communication, and machine—machine communication.

8. A method according to claim 1, wherein the classification of said vocabulary of terms is predicated on a linnean system of classification.

9. A method according to claim 8, wherein there is provided a single name space for all terms in said vocabulary.

10. A method according to claim 8, wherein said classification includes further hierarchies defined below the equivalent of 'species' level in the linnean system.

11. A method according to claim 10, wherein a species or any of its subclasses can have membership in zero taxa or any number of taxa at any level.

12. A method according to claim 8, wherein a taxon at a certain level in a hierarchy does not need to be a descendant of a taxon at the level immediately above it.

13. A method according to claim 1, wherein the expressions represent heuristics for decision support.

14. A method according to claim 1, wherein the expressions provide the medium for dialog among a plurality of problem solving resources.

15. A method according to claim 1, wherein the expressions enable bi-directional communication between problem-solving resources.

16. A method according to claim 1, wherein the strings of expressions are configured to be parsable by using pattern matches.

17. A method according to claim 1, further comprising the step of identifying context conflicts.

18. A method according to claim 1, further comprising the step of associative, commutative adding of knowledge to the problem solving resource.

19. A method according to claim 1, wherein said expressions are adapted to be reaggregated, to allow for data analysis.

20. A method according to claim 1, configured for application to the field of health.

21. A method according to claim 1, employing a dictionary of incongruous terms that are stored as associations.

22. The method according to claim 8, comprising the step of parsing expressions to detect a conflict with the linnean belief system under which the terms of the language are classified.

23. A system for coding data for use in data representation and problem solving in knowledge-based services, comprising:

means for receiving context-oriented items of information;

means for marshalling said information in a computer system;

means for providing an organised and classified vocabulary of terms which derive from a natural human language to facilitate ease of comprehension by humans, the classification of said vocabulary of terms being based on a belief system predicated on a hierarchical classification system;

means for rendering said information in the form of a string of expressions expressed in a unitary machine parsable scripting language using said vocabulary of terms, the language based upon the use of expressions containing said terms able to represent items of information;

means for inserting in said string of expressions contextual code components including contextual modifier expressions and contextual organiser expressions, said contextual code components able to provide a context of items of information, the contextual code components comprising terms from said organised and classified vocabulary of terms, each said contextual code component able to embody both an intrinsic meaning and a place value significance, the place value significance augmenting the meaning of the resultant expression depending on the positional relationship of the contextual modifier expression to a contextual organiser expression, the use of said contextual code components based on a structure of propositions, said propositions coding to express contexts selected from the group of themes, plots and subplots, each subplot being adapted to be able to contain successive further subplots, thus enabling increased expressivity using a limited number of terms in said vocabulary; and means for outputting said information as coded data for interrogation, further processing or analysis.

* * * * *